(12) United States Patent
Smith

(10) Patent No.: US 7,826,205 B2
(45) Date of Patent: Nov. 2, 2010

(54) ELECTRONIC DEVICE HAVING A MOVABLE INPUT ASSEMBLY WITH MULTIPLE INPUT SIDES

(75) Inventor: Renato L. Smith, Chicago, IL (US)

(73) Assignee: Originatic LLC, Chicago, IL (US)

( * ) Notice: Subject to any disclaimer, the term of this patent is extended or adjusted under 35 U.S.C. 154(b) by 15 days.

(21) Appl. No.: 11/315,830

(22) Filed: Dec. 22, 2005

(65) Prior Publication Data
US 2006/0098403 A1 May 11, 2006

Related U.S. Application Data

(63) Continuation-in-part of application No. 10/795,684, filed on Mar. 8, 2004, now Pat. No. 7,158,373.

(51) Int. Cl.
H05K 7/14 (2006.01)
(52) U.S. Cl. .............. 361/679.02; 361/679.21; 361/679.08; 361/679.26; 248/917
(58) Field of Classification Search ................ 361/683, 361/679.21, 679.22, 679.02, 679.31, 679.26, 361/679.08; 248/917–924
See application file for complete search history.

(56) References Cited

U.S. PATENT DOCUMENTS

| | | |
|---|---|---|
| 3,980,869 A | 9/1976 | Lombardino et al. |
| 4,281,874 A | 8/1981 | Iwans et al. |
| 4,718,740 A | 1/1988 | Cox |
| 4,922,980 A | 5/1990 | Parker |
| 4,982,618 A | 1/1991 | Culver |
| 5,168,423 A | 12/1992 | Ohgami et al. |
| 5,229,757 A | 7/1993 | Takamiya et al. |
| 5,262,762 A | 11/1993 | Westover et al. |
| 5,268,817 A | 12/1993 | Miyagawa et al. |
| D349,693 S | 8/1994 | Brossardt |
| 5,351,066 A | 9/1994 | Rucker et al. |
| D351,160 S | 10/1994 | Massey et al. |
| 5,388,032 A | 2/1995 | Gill et al. |
| 5,438,331 A | 8/1995 | Gilligan et al. |
| 5,594,619 A * | 1/1997 | Miyagawa et al. ..... 361/679.09 |
| 5,615,081 A | 3/1997 | Ma |
| 5,629,832 A * | 5/1997 | Sellers ....................... 361/680 |

(Continued)

FOREIGN PATENT DOCUMENTS

DE     19909398 A1     9/2000

(Continued)

OTHER PUBLICATIONS

"Info Appliance Offers Nice Touches, but It's Costly, Has Limitations" by Walter S. Mossberg, The Wall Street Journal, Personal Technology, col. B2, Jul. 21, 2005.

(Continued)

*Primary Examiner*—Jayprakash N Gandhi
*Assistant Examiner*—Ingrid Wright

(57) ABSTRACT

A device having at least one processor, at least one memory device accessible by the processor, a display device, a housing and a support. The support is rotatably coupled to the housing. One side of the support carries a data entry device and the other side of the support carries at least one other input device. By rotating the support between different positions, users can interchangeably operate the data entry device and the input device.

20 Claims, 36 Drawing Sheets

U.S. PATENT DOCUMENTS

| | | | |
|---|---|---|---|
| 5,657,370 | A | 8/1997 | Tsugane et al. |
| 5,673,169 | A | 9/1997 | Wicks |
| 5,739,810 | A * | 4/1998 | Merkel ........................ 345/156 |
| 5,800,085 | A | 9/1998 | Lee |
| D404,025 | S | 1/1999 | Van Horne et al. |
| 5,944,432 | A | 8/1999 | Richardson |
| 5,996,956 | A | 12/1999 | Shawver |
| 6,095,702 | A | 8/2000 | Garbacik |
| 6,121,958 | A | 9/2000 | Clark et al. |
| 6,189,849 | B1 * | 2/2001 | Sweere et al. ............ 248/286.1 |
| 6,233,138 | B1 | 5/2001 | Osgood |
| 6,256,018 | B1 | 7/2001 | Zarek |
| 6,381,132 | B1 | 4/2002 | Nakamoto |
| 6,392,871 | B1 * | 5/2002 | Yanase ........................ 361/681 |
| 6,411,502 | B1 | 6/2002 | Burrell |
| 6,414,840 | B2 | 7/2002 | Suzuki |
| 6,480,372 | B1 | 11/2002 | Vong et al. |
| 6,490,154 | B2 * | 12/2002 | Thompson .............. 361/679.41 |
| 6,587,094 | B2 * | 7/2003 | Anderson .................... 345/168 |
| 6,621,691 | B2 | 9/2003 | Howell |
| 6,628,508 | B2 | 9/2003 | Lieu et al. |
| 6,628,510 | B2 | 9/2003 | Genin |
| 6,665,175 | B1 | 12/2003 | deBoer et al. |
| 6,680,843 | B2 | 1/2004 | Farrow et al. |
| 6,688,518 | B1 | 2/2004 | Valencia et al. |
| 6,700,774 | B2 | 3/2004 | Chien et al. |
| D494,582 | S | 8/2004 | Lancaster, Jr. |
| 6,791,826 | B2 | 9/2004 | Ho |
| 6,795,304 | B1 | 9/2004 | Lam |
| 6,807,054 | B1 | 10/2004 | Waller et al. |
| 6,827,409 | B2 | 12/2004 | Michael |
| 6,847,519 | B2 * | 1/2005 | Arbisi et al. ............ 361/679.12 |
| 6,856,505 | B1 | 2/2005 | Venegas et al. |
| 6,909,408 | B2 * | 6/2005 | Matko et al. .................... 345/7 |
| 6,945,412 | B2 | 9/2005 | Felcman et al. |
| 6,956,735 | B2 | 10/2005 | Lee et al. |
| 7,004,430 | B2 | 2/2006 | Weekly |
| D551,224 | S | 9/2007 | Hatling et al. |
| 7,425,947 | B1 * | 9/2008 | Tseng et al. ................. 345/169 |
| 2002/0070922 | A1 | 6/2002 | Zarek |
| 2002/0149905 | A1 | 10/2002 | Jackson, Jr. |
| 2002/0190172 | A1 | 12/2002 | Oddsen, Jr. |
| 2003/0184957 | A1 | 10/2003 | Stahl et al. |
| 2004/0208681 | A1 | 10/2004 | Dechene |
| 2004/0227733 | A1 | 11/2004 | Fyke et al. |
| 2004/0246234 | A1 | 12/2004 | Serra et al. |
| 2005/0070324 | A1 | 3/2005 | Chadha |
| 2005/0139679 | A1 | 6/2005 | Salvato |
| 2005/0148395 | A1 | 7/2005 | Kim et al. |
| 2005/0195561 | A1 | 9/2005 | Smith |
| 2005/0243505 | A1 | 11/2005 | Jackson, Jr. |
| 2006/0098403 | A1 | 5/2006 | Smith |
| 2006/0208139 | A1 | 9/2006 | Mossman |
| 2007/0047193 | A1 | 3/2007 | Smith |
| 2007/0247800 | A1 | 10/2007 | Smith et al. |

FOREIGN PATENT DOCUMENTS

DE            10314554 A1     10/2004

OTHER PUBLICATIONS

In-Vehicle Computer, Stargate Mobile [online]. [retrieved on Nov. 3, 2005]. Retrieved from the Internet: <http://www.stargatemobile.com/ASC.html>.

Saranow, Jennifer and Chon, Gina, *Coming Soon to Your Car*, The Wall Street Journal, p. D1 (Nov. 3, 2005), pp. 1-4.

PanelPC, Panel Industrial Systems, year 2002 [online]. [retrieved on Aug. 21, 2006]. Retrieved from the Internet; http://webarchive.org/web/20030902013810/www.panelpc.com/2002/.

DATAL-Jan. 25, 2004, Datalux—Internet Archive Wayback Machine for www.datalux.com, dated Jan. 25, 2004, 2 pages [online]. [retrieved on Aug. 12, 2007]. Retrieved from the Internet: <http://web.archive.org/web/*http://www.datalux.com>.

FLATP-Jan. 21, 2004, Flat Panel—Internet Archive Wayback Machine for www.flat-panel-mount.com, dated Jan. 21, 2004, 5 pages [online]. [retrieved on Aug. 12, 2007]. Retrieved from the Internet: <http://web.archive.org/web/*http://www.flat-panel-mount.com>.

ISSIN-Feb. 7, 2004, ISS—Internet Archive Wayback Machine for www.issltd.co.uk, dated Feb. 7, 2004, 3 pages [online]. [retrieved on Aug. 12, 2007]. Retrieved from the Internet: <http://web.archive.org/web/*http://www.issltd.co.uk.com>.

INFOL-Jan. 8, 2004, Infologix—Internet Archive Wayback Machine for www.infologixsys.com, dated Jan. 8, 2004, 3 pages [online]. [retrieved on Aug. 12, 2007]. Retrieved from the Internet: <http://web.archive.org/web/*http://www.infologixsys.com>.

SONYS-Nov. 11, 2002(2), Sony's All-in-One Desktop—Enlarged Product Image, by Bill Howard, PC Magazine, dated Nov. 8, 2002 [retrieved on Aug. 12, 2007]. Retrieved from the Internet: <http://www/pcmag.com/article2/0,4149,677305,00.asp>.

BEYON-Mar. 7, 2003, Beyond Digital Living—Press, Salton's Beyond Icebox FlipScreen Wins the Consumer Electronics Association Mark of Excellence Award, Seattle—Mar. 7, 2003, 2 pages [online]. [retrieved on Aug. 12, 2007]. Retrieved from the Internet: <http://www.beyondconnectedhome.com/aboutus/press/pr_030307.html>.

ALLIN-Oct. 5, 2006, All-In-One Multimedia Powerhouse, Cnet [online]. [retrieved on or before Oct. 5, 2006]. Retrieved from the Internet: <http://www.cnet.com>.

BOLDA-Oct. 5, 2006, Boldata LCD PC CP414 Series, Cnet [online]. [retrieved on or before Oct. 5, 2006]. Retrieved from the Internet: <http://www.cnet.com>.

IONEA-Oct. 5, 2006, I-One All-In-One LCD PC-TV, Cnet [online]. [retrieved on or before Oct. 5, 2006]. Retrieved from the Internet: <http://www.cnet.com>.

SINOC-Oct. 5, 2006, Sinocan All-In-One PC 2006, Cnet [online]. [retrieved on or before Oct. 5, 2006]. Retrieved from the Internet: <http://www.cnet.com>.

TEKPA-Oct. 5, 2006, Tek Panel 320, Cnet [online]. [retrieved on or before Oct. 5, 2006]. Retrieved from the Internet: <http://www.cnet.com>.

GATEW-Jan. 7, 2004, Gateway's Media Center PC, Cnet, dated Jan. 7, 2004 [online]. [retrieved on or before Oct. 5, 2006]. Retrieved from the Internet: <http://www.cnet.com>.

GATEW-Oct. 5, 2006, Gateway Profile 6C, Cnet, dated Oct. 12, 2006 [online]. [retrieved on or before Oct. 5, 2006]. Retrieved from the Internet: <http://www.cnet.com>.

MPCSC-Jul. 21, 2003, MPC's ClientPro Line, Cnet, dated Jul. 21, 2003 [online]. [retrieved on or before Oct. 5, 2006]. Retrieved from the Internet: <http://www.cnet.com>.

PELHA-Sep. 11, 2003, Pelham Sloan PS1500, Cnet, dated Sep. 11, 2003 [online]. [retrieved on or before Oct. 5, 2006]. Retrieved from the Internet: <http://www.cnet.com>.

SuperLogics, SL-PPC-120 [online]. [retrieved on Aug. 2, 2006]. Retrieved from the Internet: <http://www.superlogics.com/industrial-computers/panel-pc-computer/SL-PPC-120/35-1900.htm.>.

"Sony's All-in-One Desktop" by Bill Howard, PC Magazine, dated Nov. 8, 2002 [retrieved on Jan. 7, 2007]. Retrieved from the Internet: <http://www/pcmag.com/article2/0,4149,677305,00.asp>.

Description of Medical Computers, compiled by Originatic LLC, Jan. 8, 2007, pp. 1-16.

Beyond Icebox Flipscreen '04 Kitchen Entertainment, eSalton [online]. [retrieved on Aug. 16, 2006]. Retrieved from the Internet: <http://www.esalton.com/control/product>.

* cited by examiner

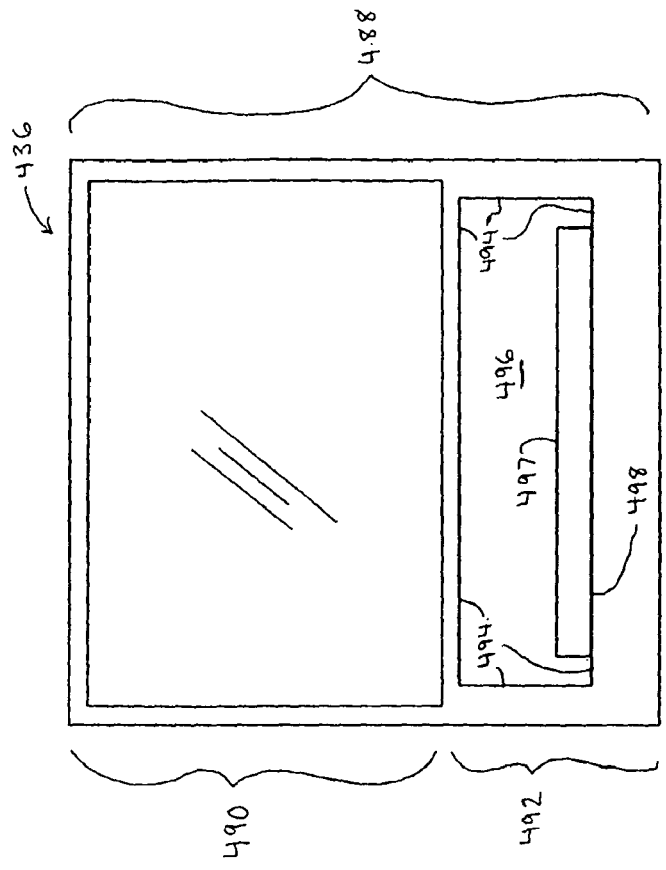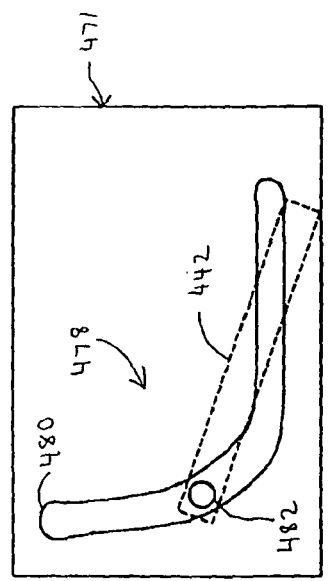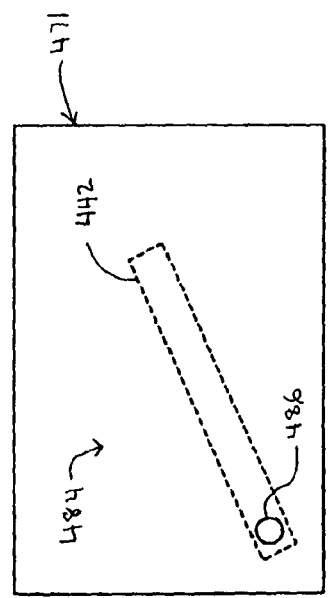

ELECTRONIC DEVICE HAVING A MOVABLE INPUT ASSEMBLY WITH MULTIPLE INPUT SIDES

PRIORTY CLAIM

This application is a continuation-in-part of, and claims the benefit and priority of, U.S. patent application Ser. No. 10/795,684, filed on Mar. 8, 2004, now U.S. Pat. No. 7,158,373 entitled "Wall-Mountable Computer Having An Integrated Keyboard."

CROSS REFERENCE TO RELATED APPLICATIONS

This application is related to the following commonly-owned co-pending patent application: U.S. patent application Ser. No. 10/795,645, filed on Mar. 8, 2004. entitled "Facility Management Computer System Operable For Receiving Data Over A Network Generated By Users and Sensors;" U.S. patent application Ser. No. 11/509,392, filed on Aug. 24, 2006, entitled "Mountable Electronic Device Having an Input Device;" U.S. patent application Ser. No. 11/787,999, filed on Apr. 17, 2007, entitled "Assembly Having A Main Unit And A Mounting Unit;" U.S. patent application Ser. No. 29/285,998, filed on Apr. 17, 2007, entitled "Electronic Device;" U.S. patent application Ser. No. 29/294,304, filed on Jan. 3, 2008, entitled "Electronic Device;" U.S. patent application Ser. No. 29/294,642, filed on Jan. 18, 2008, entitled "Electronic Device;" U.S. patent application Ser. No. 12/074,811, filed on Mar. 6, 2008, entitled "Advertisement System And Method Involving A Mountable Electronic Device Electronic Device Having An Input Device;" and U.S. patent application Ser. No. 29/307,997, filed on May 22, 2008, entitled "Electronic Device."

INCORPORATION BY REFERENCE

The following U.S. patent application is hereby incorporated herein by reference: U.S. patent application Ser. No. 10/795,684, filed on Mar. 8, 2004, entitled "Wall-Mountable Computer Having An Integrated Keyboard."

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

There is a growing role of desktop computers, portable computers, hand-held electronic devices, digital assistants, mobile phones, digital cameras, electronic game devices and other electronic devices in the everyday lives of people. As a result, there is a need to increase the accessibility, operational convenience, number of functions and space efficiency of such devices.

SUMMARY OF THE INVENTION

The computer or electronic device, in one embodiment, includes a housing, a display device and an input assembly rotatably coupled to the housing. One side of the input assembly mounts a data entry device, and the other side of the input assembly mounts a set of control buttons or other input devices. To enter data, the user can rotate the input assembly so that the data entry device is facing outward and accessible. To make a different type of input, the user can conveniently rotate the input assembly so that the input devices are facing outward and accessible.

Additional features and advantages of the present invention are described in, and will be apparent from, the following Detailed Description of the Invention and the figures.

BRIEF DESCRIPTION OF THE FIGURES

FIG. 35 is a side elevation view of a slot and groove device used to couple a keyboard to a computer housing of a mountable computer in one embodiment.

FIG. 36 is a side elevation view of a pivot or hinge device used to couple a keyboard to a computer housing of a mountable computer in one embodiment.

FIG. 37 is a front elevation view of a computer having an opening below the display device for positioning of the hands while the user is operating a keyboard, wherein the keyboard is connected to the lower portion of the computer housing in one embodiment.

DETAILED DESCRIPTION OF THE INVENTION

Figure 1:
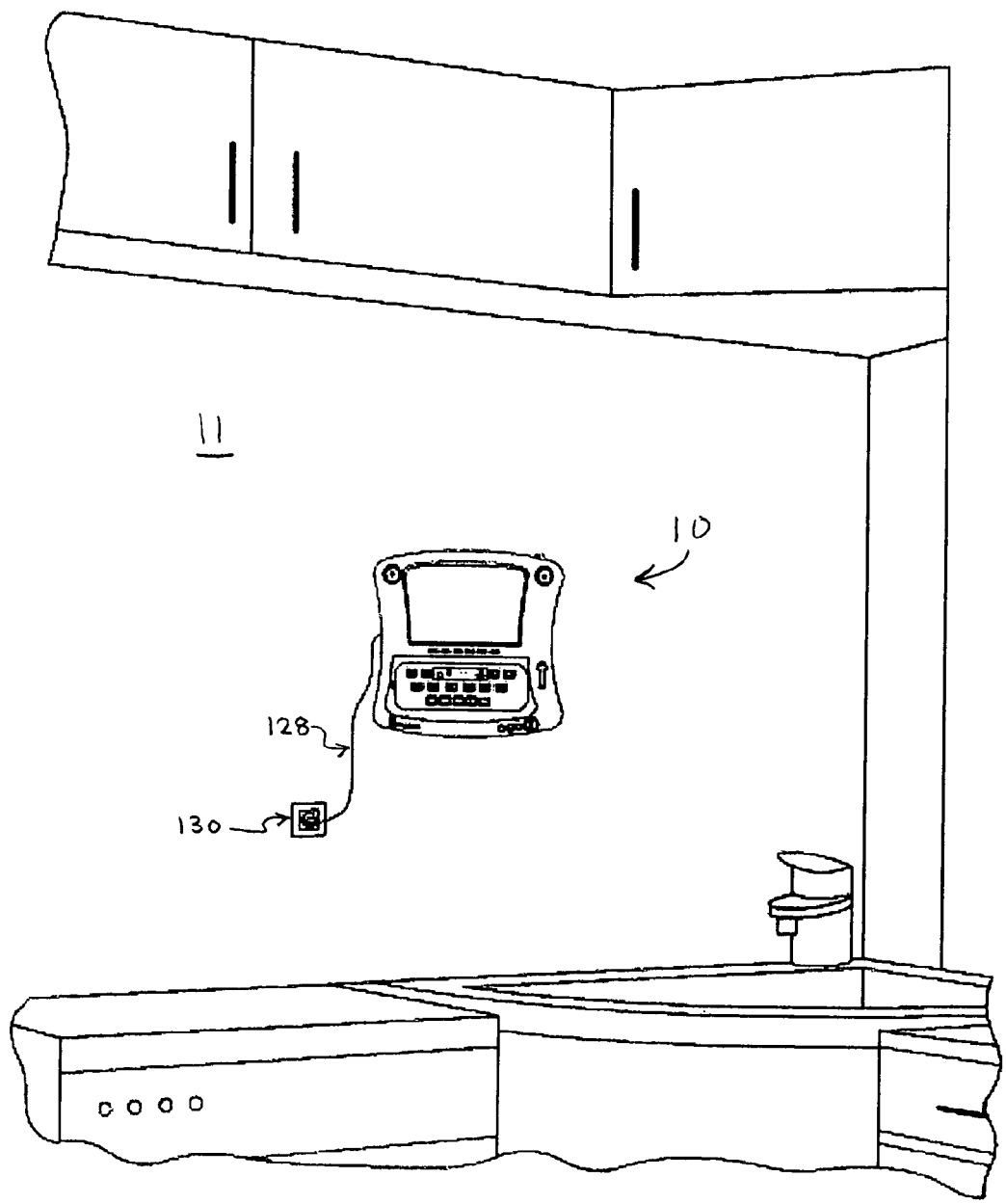
FIG. 1 is a front elevation view of the hangeable or mountable electronic device hung on a wall in one embodiment.
Figure 2:
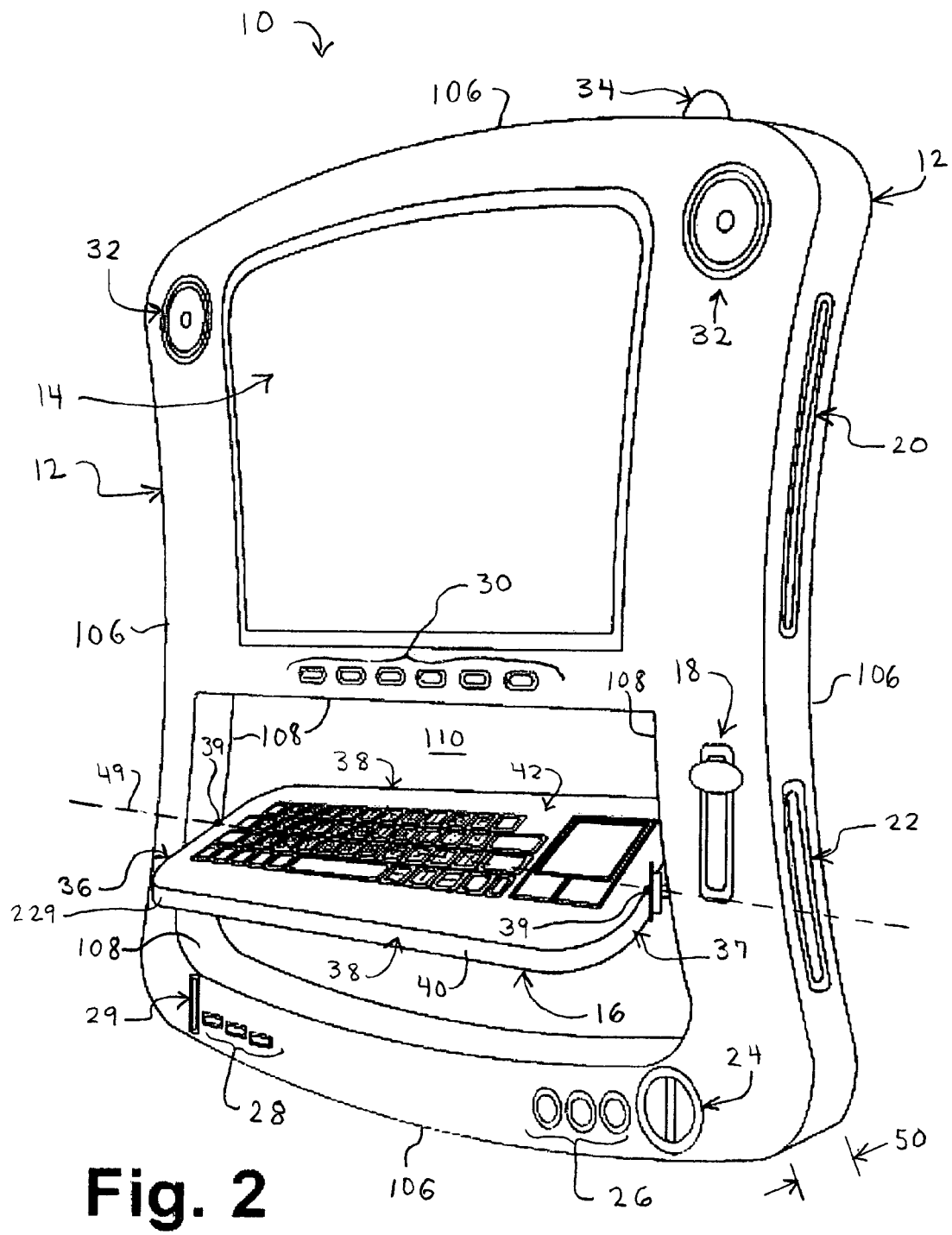
FIG. 2 is a front perspective view of the hangeable or mountable electronic device of FIG. 1.
Figure 3:
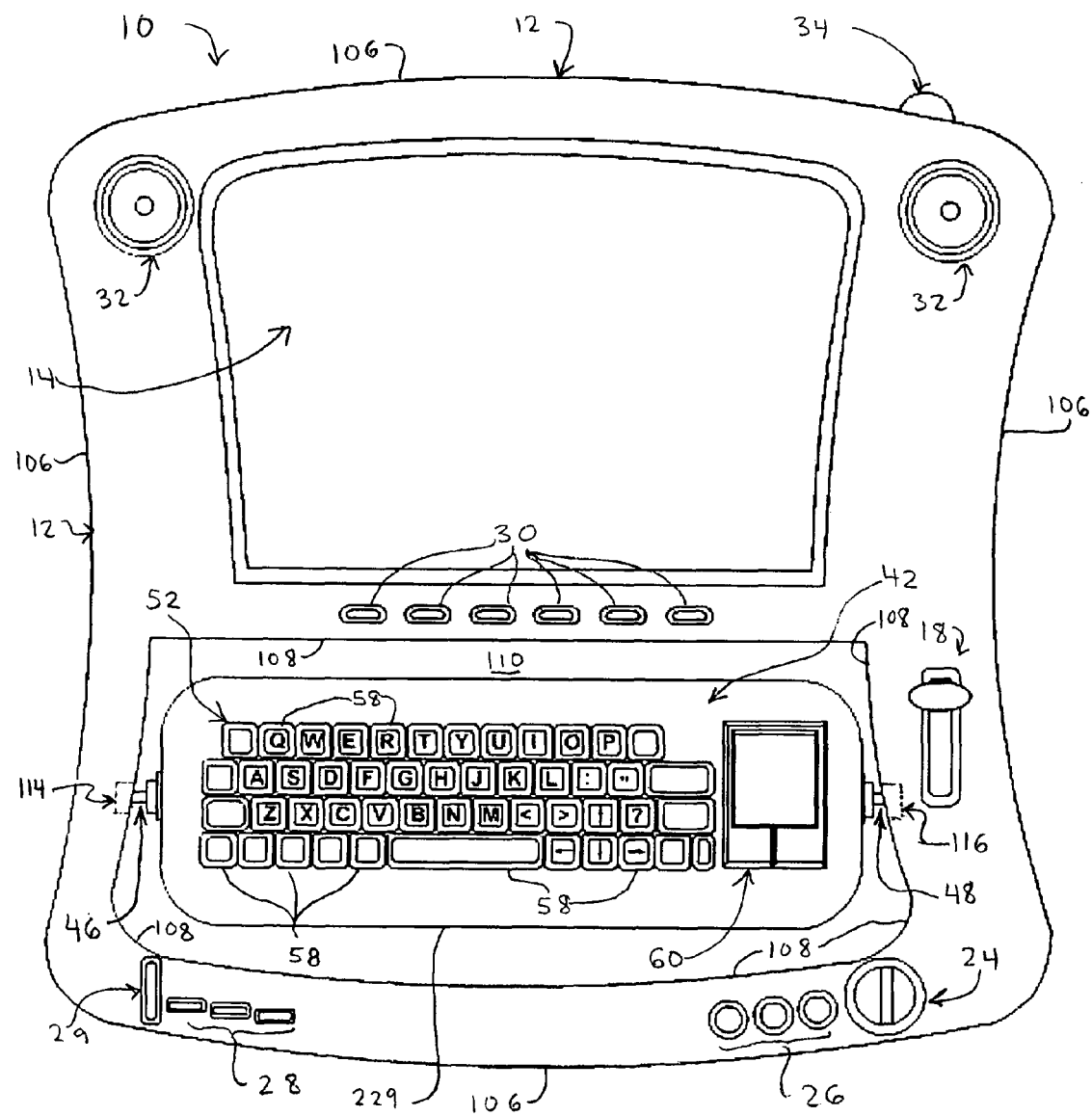
FIG. 3 is a front elevation view of the hangeable or mountable electronic device of FIG. 1, illustrating the data entry side of the input assembly.
Figure 4:
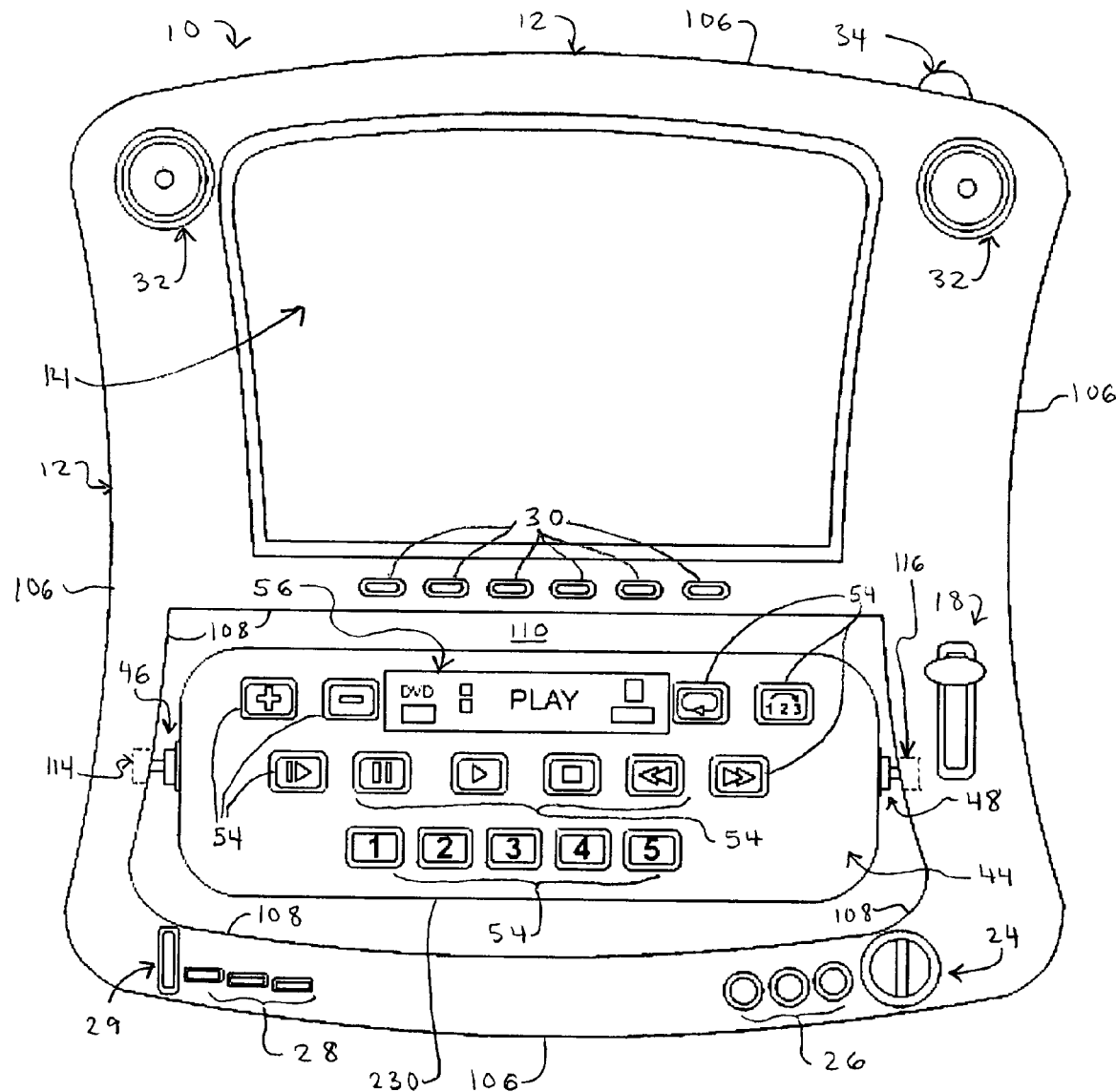
FIG. 4 is a front elevation view of the hangeable or mountable electronic device of FIG. 1, illustrating the input side of the input assembly.
Figure 5:
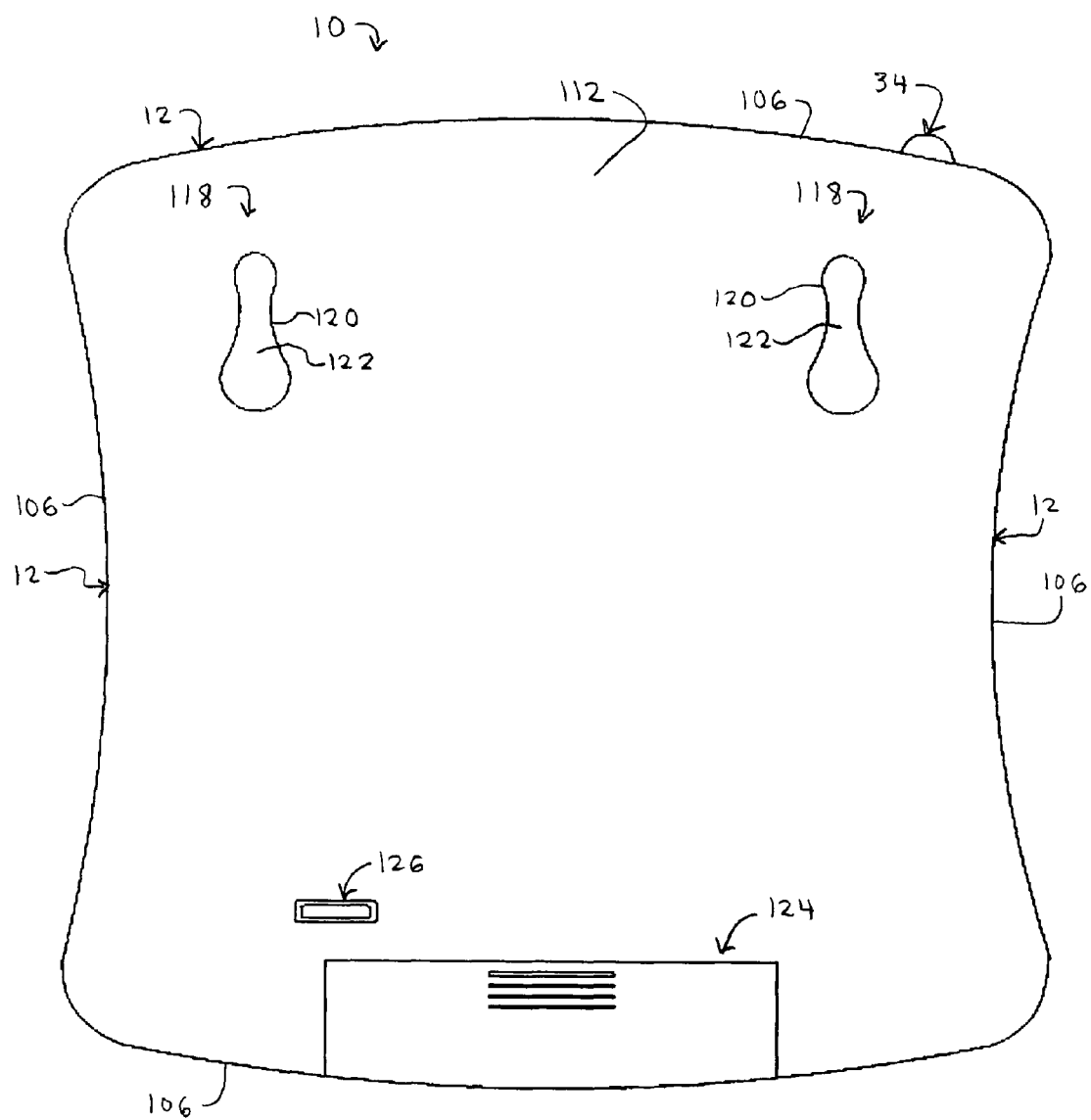
FIG. 5 is a rear elevation view of the hangeable or mountable electronic device of FIG. 1.
Figure 6:
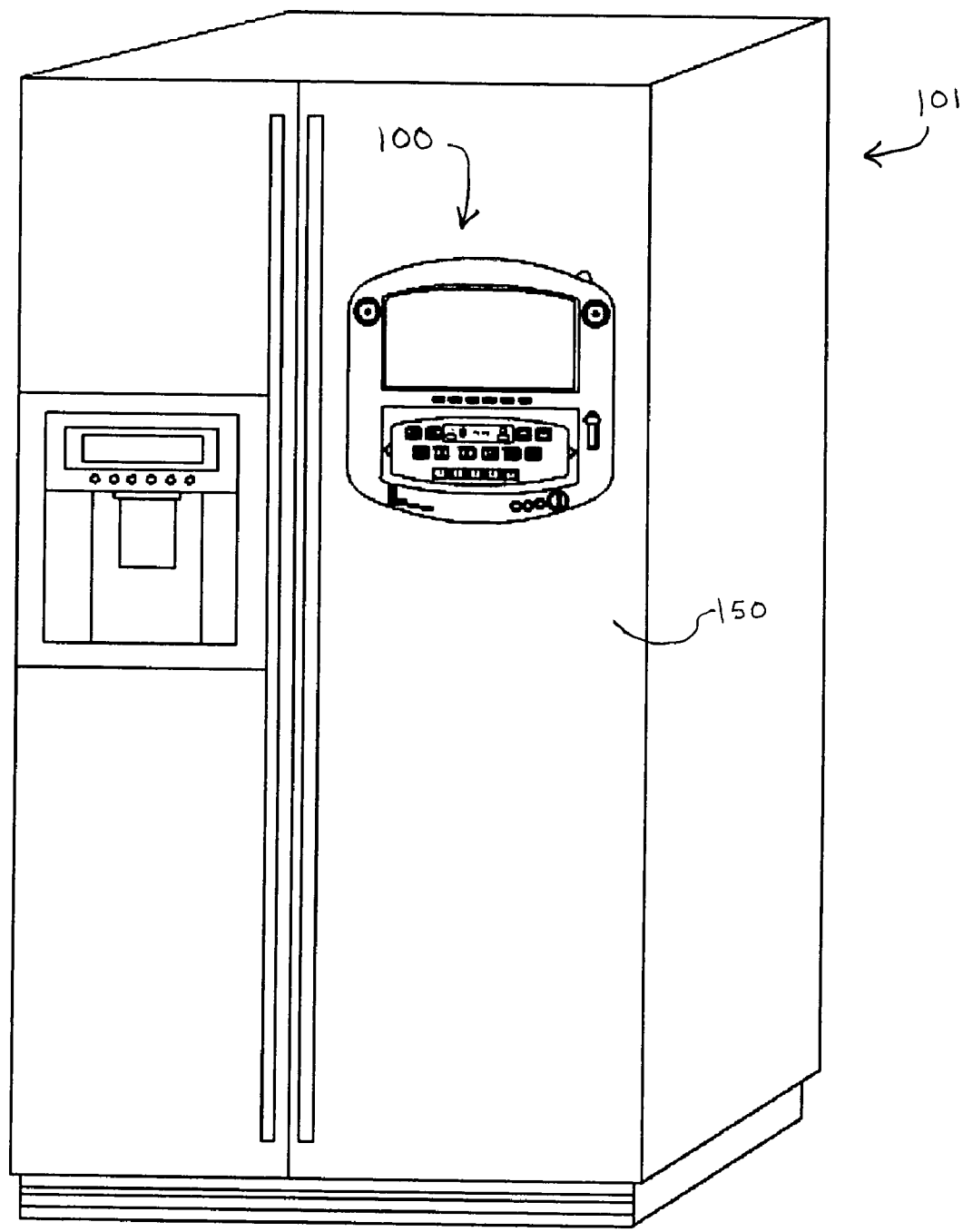
FIG. 6 is a front elevation view of the magnetically-mountable electronic device attached to a refrigerator in one embodiment.
Figure 7:
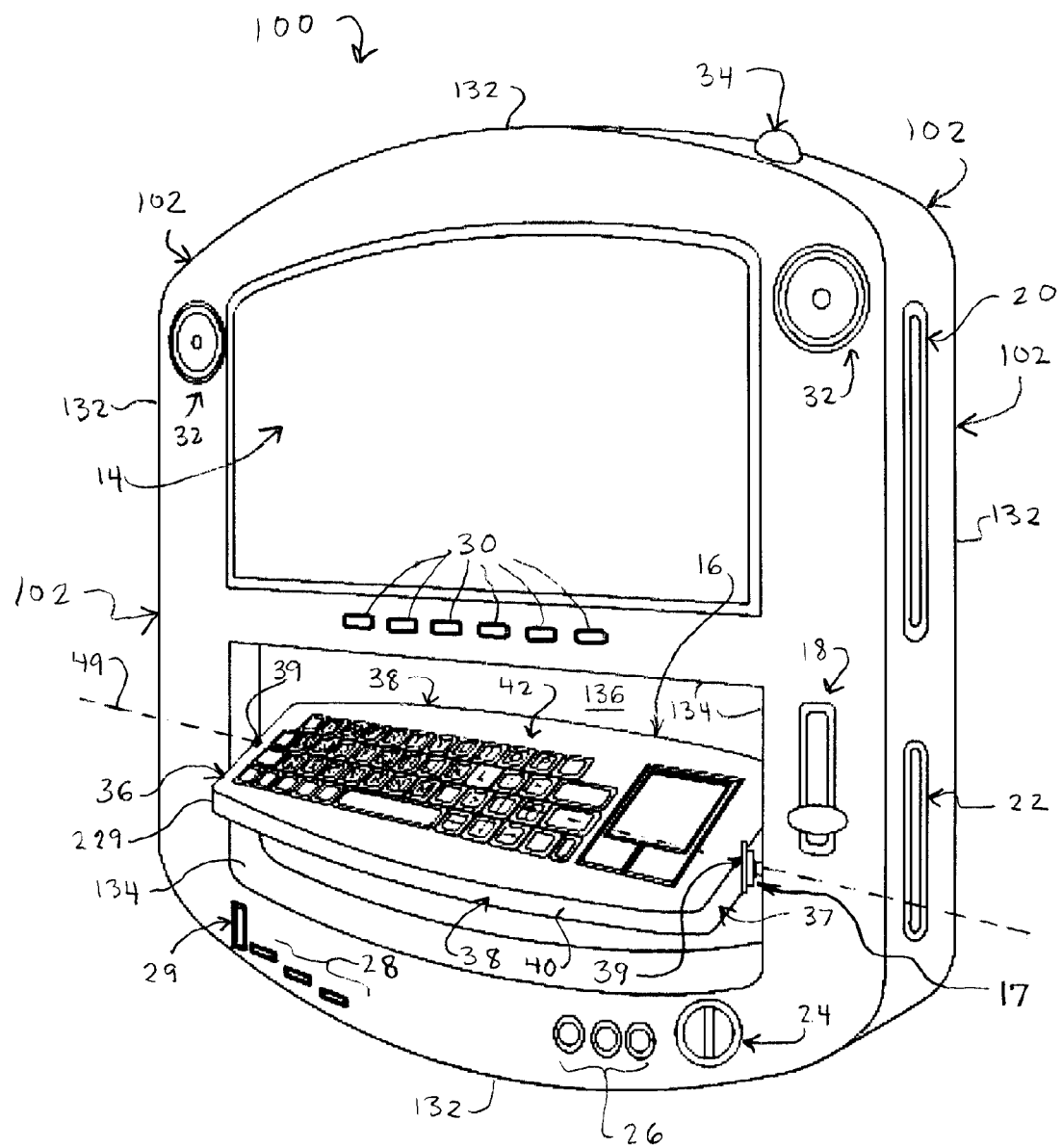
FIG. 7 is a front perspective view of the magnetically-mountable electronic device of FIG. 6.
Figure 8:
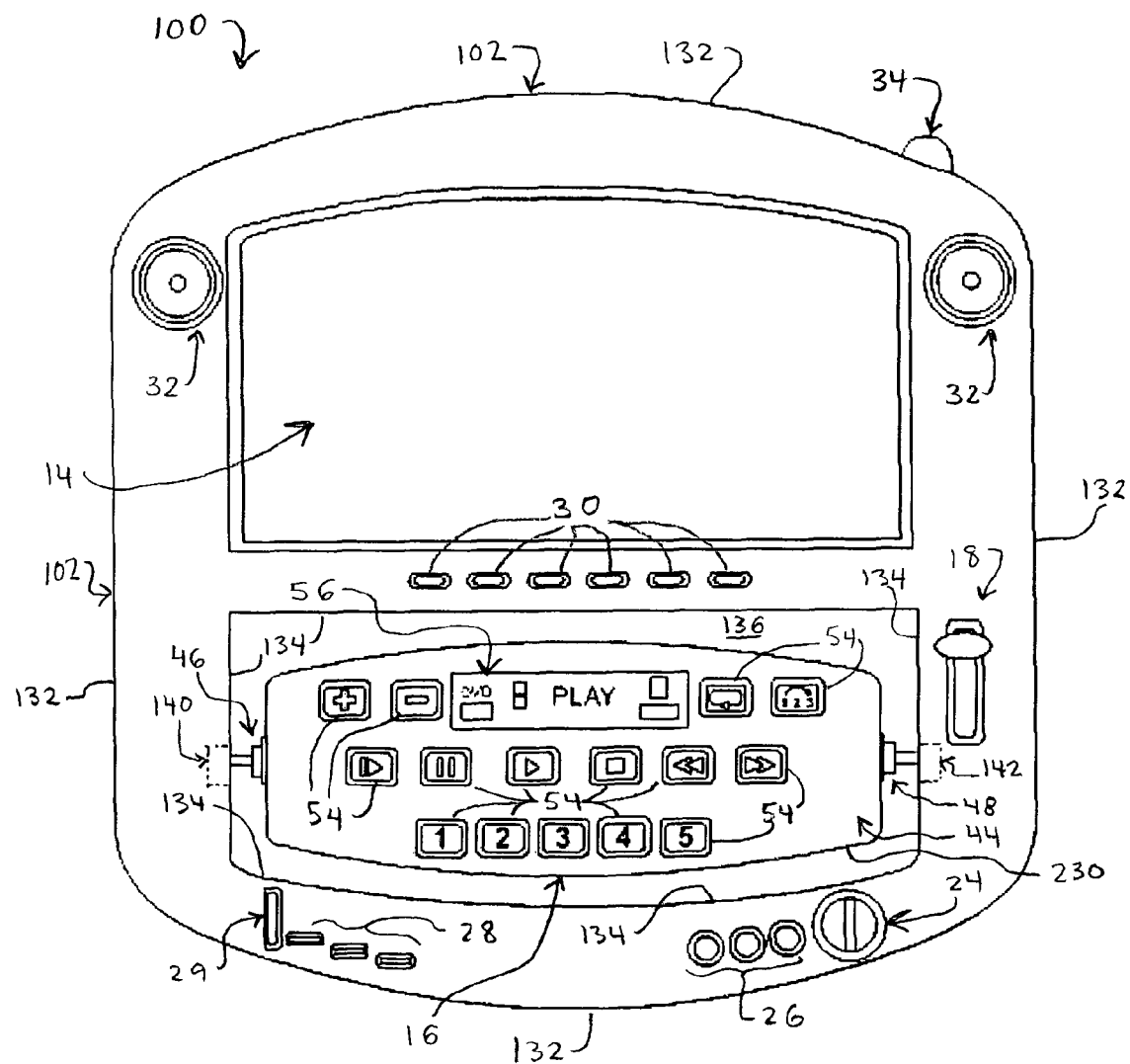
FIG. 8 is a front elevation view of the magnetically-mountable device of FIG. 6, illustrating the input side of the input assembly.
Figure 9:
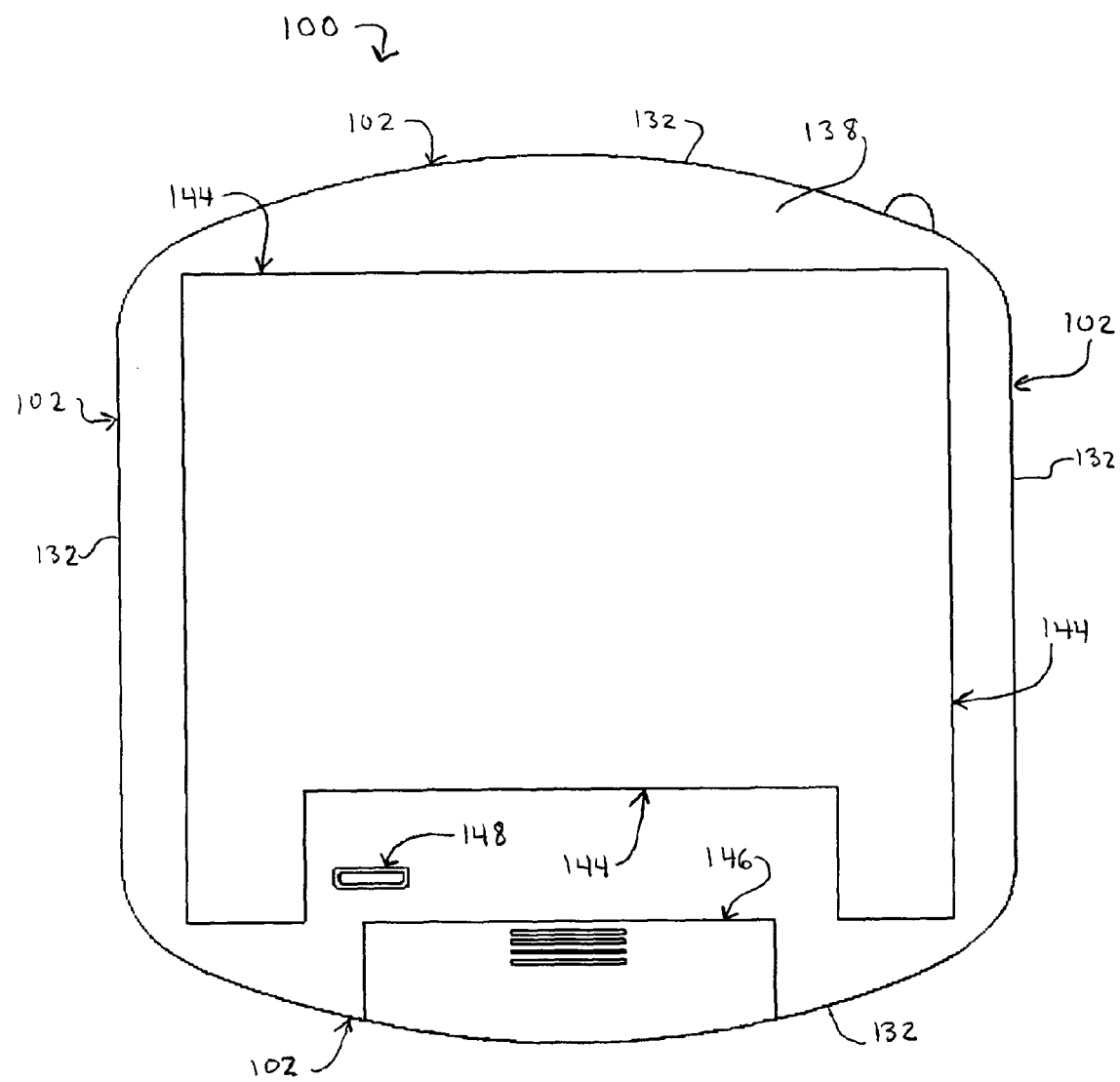
FIG. 9 is a rear elevation view of the magnetically-mountable electronic device of FIG. 6.

1. Electronic Device Mountable to Upright Structures

Referring to FIGS. 1 through 15, the wall-mountable computer or electronic device 10 is attachable to or hangeable on a room wall 11, and the magnetically-mountable electronic device 100 is attachable to a refrigerator 101. The computers or electronic devices 10 and 100 each include the chasses or housings 12 and 102, respectively. Each of the housings 12 and 102, in one embodiment, houses or otherwise supports suitable circuitry components, hardware and software, such as the electronic system 152 described below with respect to FIG. 15. In one embodiment, each of the electronic devices 10 and 100 includes: (a) a monitor, screen or display device 14 supported by the housing of such electronic device, such as the substantially flat Liquid Crystal Diode (LCD) screen illustrated in the figures; (b) an input assembly 16 rotatably coupled to the housing 12; (c) a position control device 18 operatively coupled to the input assembly 16; (d) a compact disk drive 20 and a floppy disk drive 22; (e) a power button 24 and a plurality of different status indicators 26, such as Light Emitting Diodes (LEDs), operable to visually indicate the status of various operational parameters of the electronic device 10 or 100, in each case; (f) a plurality of data exchange devices or data ports 28 operable to couple external devices (such as flash memory sticks or removably data storage devices, printers, scanners and Personal Digital Assistants (PDAs)) to the electronic device 10 or 100 (in each case) through use of a data cable, cord or connector; (g) a slidable door 29 operable to cover the ports 28; (h) a plurality of control buttons 30 operable to provide inputs for controlling settings for the display device 14 and performance settings for the electronic device 10 or 100 (in each case); (i) a plurality of sound output devices or speakers 32 operable to output music and other sounds; and (j) a signal receiving and transmitting device 34, such as a radio frequency (RF) transceiver, which wirelessly couples the processor 154 (shown in FIG. 15) to a data network, such as the Internet.

In one embodiment, the input assembly 16 of each electronic device 10 and 100 has: (a) a plurality of ends or end regions 36 and 37, each of which has a midpoint 39; (b) a plurality of sides or side regions 38; (c) a support or body 40 having a substantially flat data entry side 42 and a substantially flat input side 44; and (d) a plurality of spindles or shafts 46 and 48 which are rotatably coupled to the housing of such electronic device. The input assembly 16 is rotatable about axis 49, and, in one embodiment, the axis 49 passes through the midpoints 39.

In one embodiment, each of the lengths of the ends 36 and 37 has a length which is less than or equal to the width 50 of the housing 12 and 102, in each case. As such, the input assembly 16 is spinnable or rotatable about three hundred sixty degrees while the devices 10 and 100 are mounted to the wall 11 and refrigerator 13, respectively. In another embodiment, the ends 36 are greater than the width 50. Here, the user removes the devices 10 and 100 from the wall 11 and refrigerator 13, respectively, in order to spin or rotate the input assembly 16 through three hundred sixty degrees.

The data entry side 42 supports a data entry input device or keyboard 52, and the input side 44 supports a control panel, a plurality of control buttons, touch actuable areas or supplementary input devices 54. The input side 44 also supports a relatively small visual output device or supplementary display device 56, such as a miniature LCD screen.

The keyboard 52, in one embodiment, includes: (a) a plurality of touch actuatable areas or movable keys 58 suitable for entering data; and (b) a keyboard processor 79 (illustrated in FIG. 11) operatively coupled to the keys 58 and to the processor 154 of the device 10 or 100, in each case. In one embodiment, the keyboard 52 includes a QWERTY keyboard having all of the alphabetic keys and one or more special keys, such as arrow keys, text editing keys, modifier keys and other suitable keys. In another embodiment, the keyboard 52 also includes a set of numeric keys. The keyboard 52 can have any suitable number and types of keys, and the keys can be full-sized keys or reduced-sized keys.

Though not illustrated, it should be understood that the keyboard 52 can include one or more of the numeric keys, function keys or any other keys of a commercially available enhanced keyboard having one hundred and one keys or one hundred and four keys. The keyboard 52 also includes a finger-steerable curser mover, such as touch pad 60. In another embodiment, the keyboard 52 includes a built-in mouse or track ball mouse. The size of the keyboard 52 can vary with the size of the body 40 which, in turn, can vary with the size of the electronic device 10 or 100, in each case.

The supplementary input device 54 of the input side 44 are associated with any suitable input or output of the electronic device 10 or 100, in each case. In the example illustrated in FIGS. 4 and 8 the supplementary input device 54 are associated with controlling the output and performance of the audio system and video system of the electronic system 152. The supplementary input device 54 include audio-video buttons and indicators for controlling and monitoring play, pause, skip forward, skip backward, repeat, random play, disk selection, sound track selection and other audio or visual functions. The supplementary display device 56 displays images related to the performance of the audio or video system of the electronic device 10 or 100, in each case. In the example illustrated, the supplementary display device 56 displays the play mode of the DVD video system.

Figure 10:
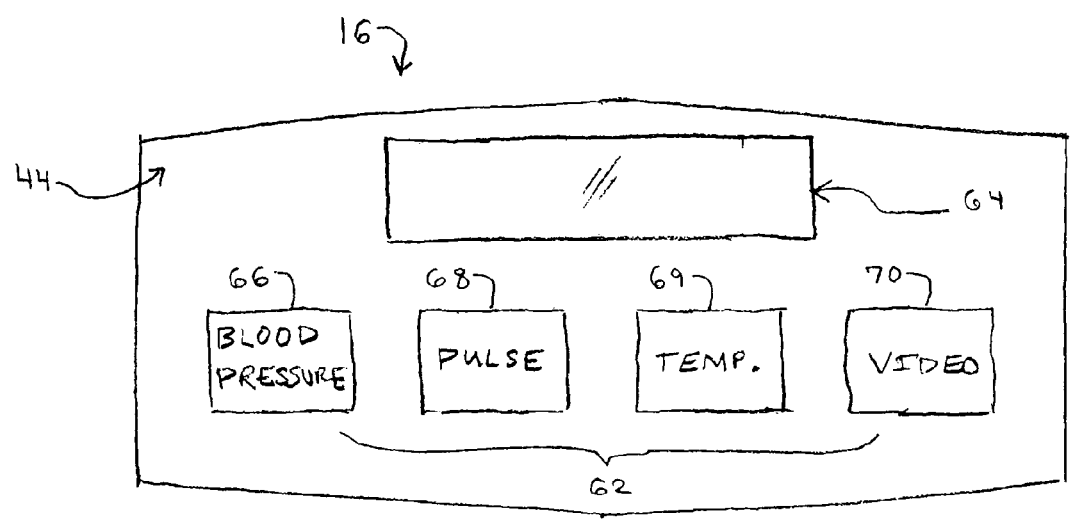
FIG. 10 is a top plan view of the input side of the input assembly in one embodiment.

In another example illustrated in FIG. 10, the input side 44 has supplementary buttons or input devices 62 and supplementary display device 64. The supplementary input devices 62 and supplementary display device 64 have functions related to the control of and monitoring of one or more medical devices in a health care facility, such as a hospital. In this example, the device 10 is hung on or otherwise secured to the wall of a hospital hallway or patient room. The device 10 is electronically coupled to one or more patient monitoring devices over an electronic health or hospital data network. In this embodiment, the electronic system 152 of the device 10 includes a plurality of medical-related software programs or computer code stored within ROM 162, described below with respect to FIG. 15. The functionality of the supplementary input devices 62, as determined by the electronic system 152, can have various patient monitoring functions. For example, by activating blood pressure button 66, the display device 14 or 64 indicates the blood pressure of a patient; by activating pulse button 68, the display device 14 or 64 displays a graph of the patient's pulse; by activating temperature button 69, the display device 14 or 64 indicates the temperature of a patient; and by activating video button 70, the display device 14 or 64 displays a live video of the patient.

It should be appreciated that, in other embodiments, the ROM 162 (described below) can store task-specific or industry-specific operating systems, applications and software suitable for use of the devices 10 and 100 in any suitable environment, including, but not limited, to health care facilities, factories, plants, restaurants, stores, retail enterprises, public facilities (such as airports, train stations, bus stations, road-side rest facilities and museums), police stations, prisons, military-related facilities, administrative buildings, municipal, state and federal buildings, court buildings, hotels, resorts, amusement parks, game rooms, stadiums and other facilities with a relatively high occupancy or flow of traffic. In each such case, the ROM 162 can store an operating system, software and programs which are specifically related to the purpose and function of such environments.

Figure 11:
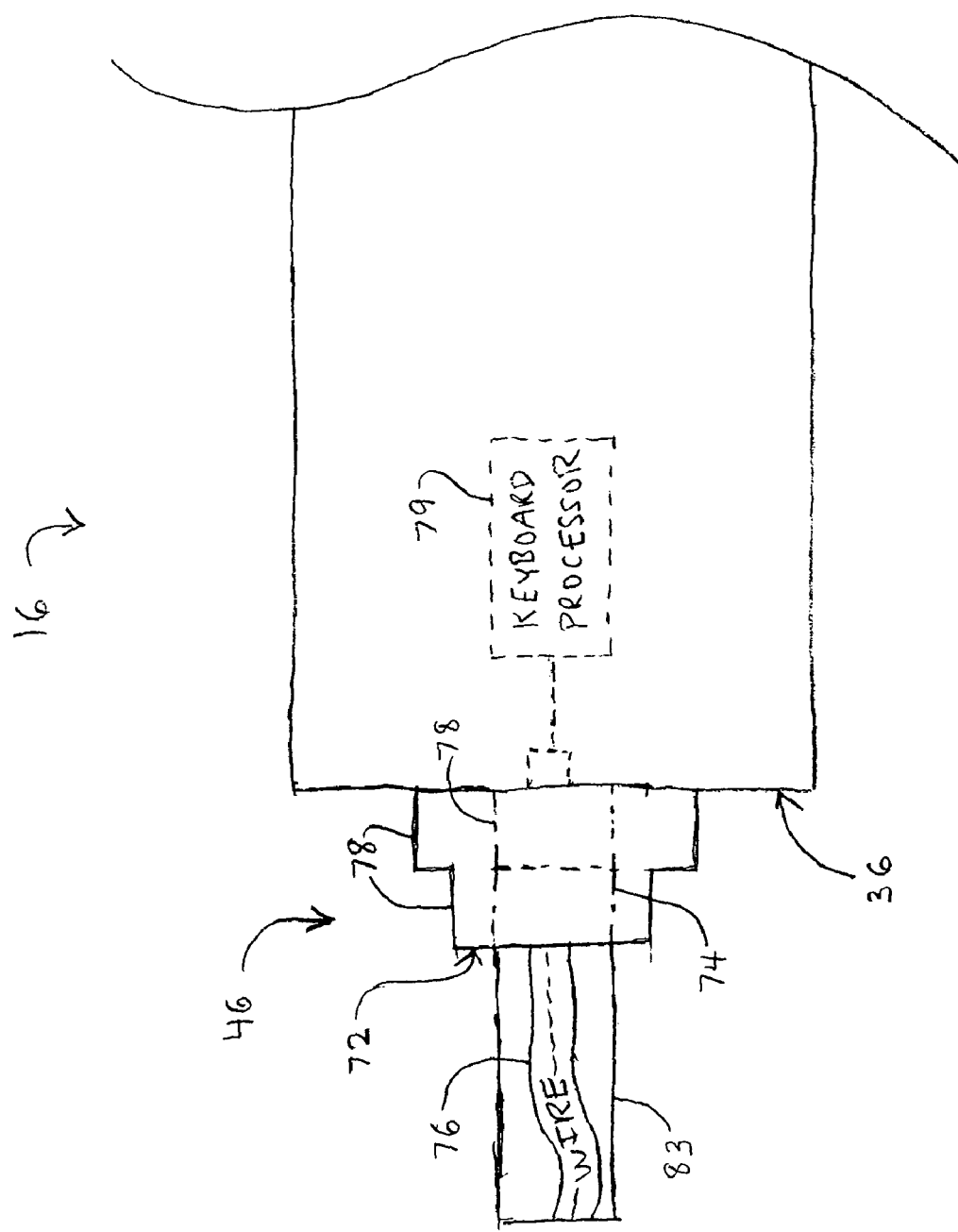
FIG. 11 is an enlarged side elevation view of one shaft of the input assembly in one embodiment.

As illustrated in FIG. 11, in one embodiment, at least one of the shafts 46 and 48 includes an electrical rotary connector 72 which electrically or electronically couples the input assembly 16 to the processor 154 of the electronic system 152. In the illustrated example, the rotary connector 72 is a suitable slip ring assembly which includes: (a) a rotatable conductive contact member or rotor 74 connected to an electrical or data cord, cable, wire or wire assembly 76 which, in turn, is coupled to the processor 154; (b) a conductive contact member 78 coupled to the keyboard processor 79; (c) a holder or housing 80 which holds the rotor 74 and contact member 78 in contact with each other; and (d) a shaft member 83 which houses or receives part of the wire 81. In one embodiment, the rotor 74 includes a conductive brush which is engaged with the contact member 78. In operation, as the input assembly 16 is rotated or spun, the rotor 74 rotates relative to the contact member 78. Because the rotor 74 is in contact with the contact member 78, electricity and electronic signals can travel between the rotor 74 and contact member 78 while the input assembly 16 is rotating through a suitable angle or spinning through an angle of three hundred and sixty degrees.

Figure 12:
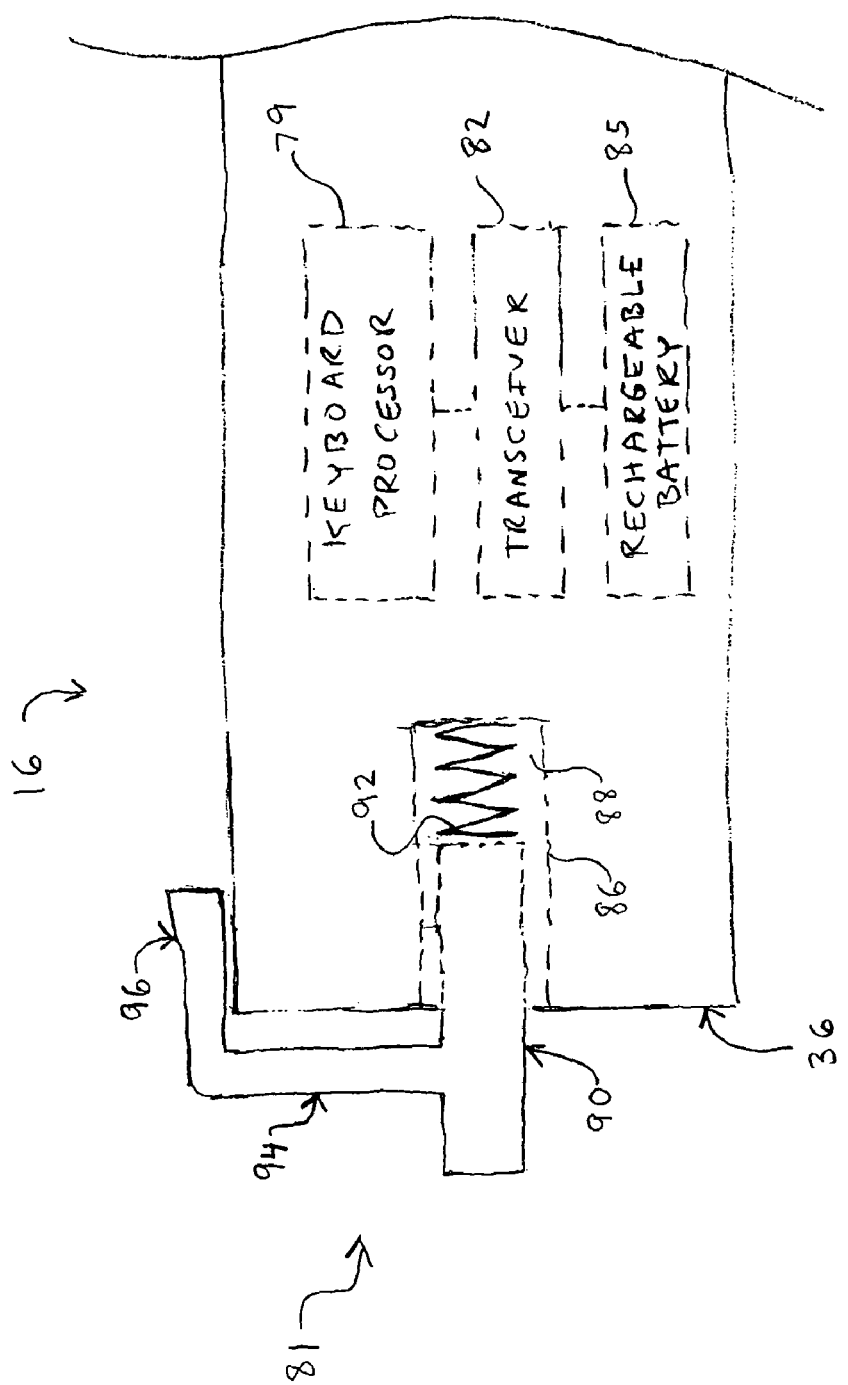
FIG. 12 is an enlarged side elevation view of the detachment assembly of the input assembly in one embodiment.

In another embodiment illustrated in FIG. 12, the input assembly 16 is detachable from the housing 10 or 100, in each case. Here, the input assembly 16 includes: (a) a detachment assembly 81; (b) a receiving and transmitting device or transceiver 82 which wirelessly couples the input assembly 16 to the processor 154 of the electronic device 10 or 100, in each case; and (c) a rechargeable battery 85. The detachment assembly 81 is described herein only with respect to the left end 36 of the input assembly 16 because, in one embodiment, the left end 36 and right end 37 of the input assembly 16 each have the same structure, components and detachment assembly 81. The detachment assembly 81 includes: (a) a cavity wall 86 defining a cavity 88; (b) a shaft member 90 movably positioned within the cavity 88; (c) a biasing member or spring 92 housed within the cavity 88; (d) an arm 94 connected to the shaft member 90; and (e) a hand or finger grip 96 connected to the arm 94.

Figure 13:
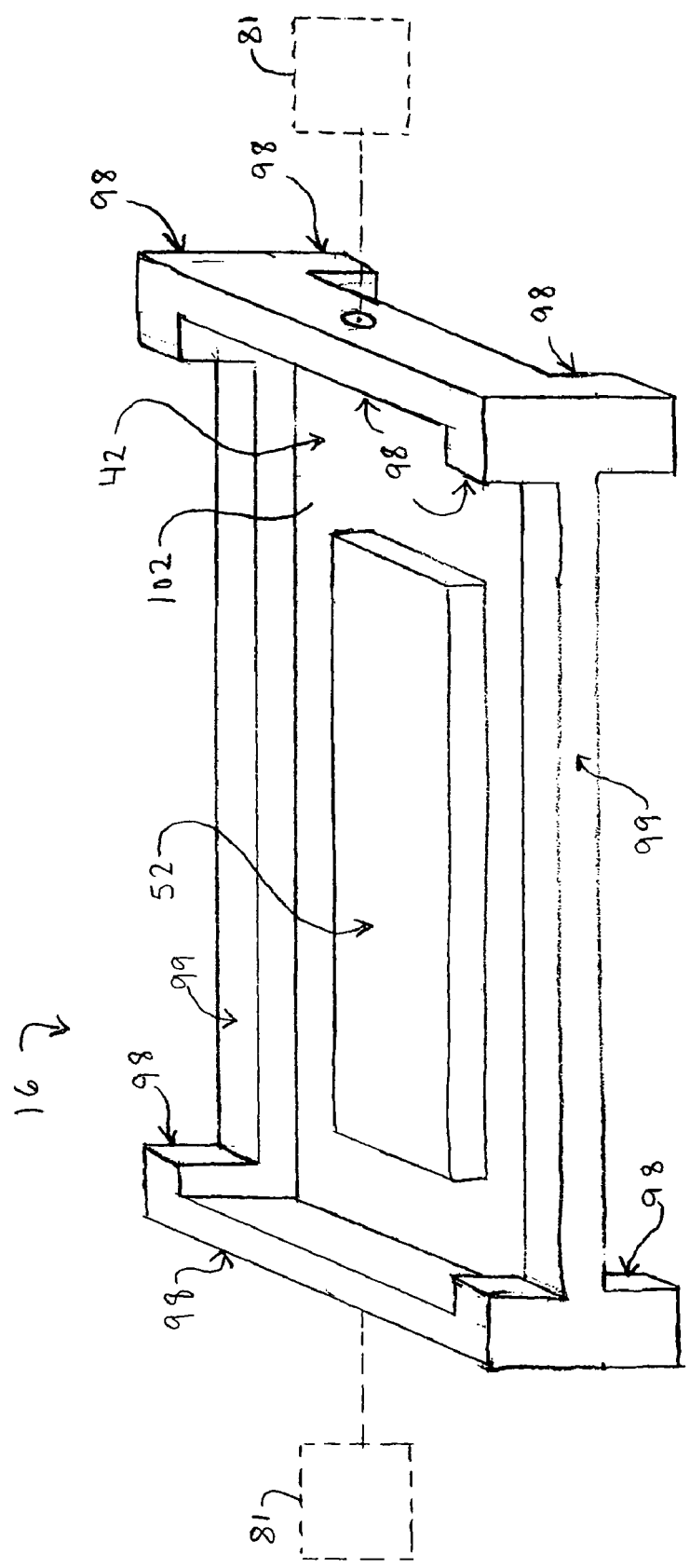
FIG. 13 is top perspective view of the data entry side of the detachable input assembly with guard walls in one embodiment.
Figure 14:
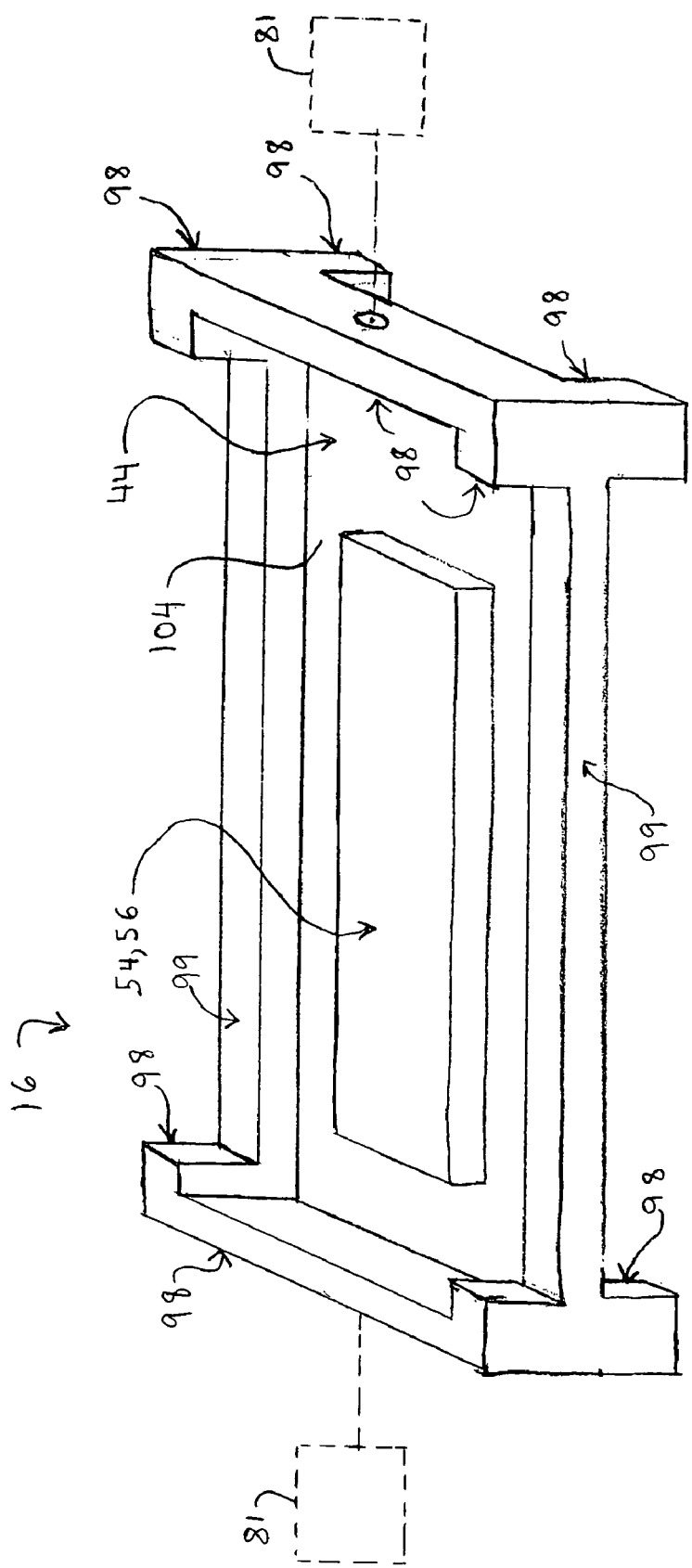
FIG. 14 is top perspective view of the input side of the detachable input assembly of FIG. 13.

In this embodiment, the data entry side 42 and the input side 44 each include one or more feet, guard members or guard walls 98, as illustrated in FIGS. 13 and 14. The guard walls 98 extend from the surfaces 102 and 104 of the data entry side 42 and input side 44, respectively. The guard wall 98 has a lowered wall 99 which extends a length equal to or greater than the area of the keys 58 and supplementary input device 54.

To detach the input assembly 16 in this embodiment, the user slides the grip 96 toward the center of the input assembly 16, causing the shafts 46 and 48 to disengage from the housing of the electronic device 10 or 100, in each case. The user then detaches and removes the entire input assembly 16 from the housing of the device 10 or 100, as the case may be. The user then places the input side 44 face down on a table or on the user's lap. The data entry side 42 is then facing upward. The user types and enters data using the keyboard 56 of the data entry side 42 while the guard walls 98 and 99 protect and guard the supplementary display device 56 and supplementary input devices 54 of the input side 44. When ready to use the input side 44, the user flips the input assembly 16 over and positions the input side 44 facing upward. In this position, the data entry side 42 can lie face down on a table or on the user's lap. The user operates the supplementary input device 54 while the guard walls 98 and 99 protect and guard the keys 58 of the keyboard 52.

In one embodiment, the electronic devices 10 and 100 each include: (a) at least one electric motor; (b) a drive assembly which couples the motor to the input assembly 16, enabling the motor to power the rotational movement of the input assembly 16; and (c) a damper or speed control device 17 coupled to the input assembly 16. The speed control device produces a drag force on the input assembly 16, which provides the input assembly 16 with a relatively smooth and steady rate of rotational movement.

1.1. Wall Mount Housing

For the wall-mountable computer or electronic device 10 illustrated in FIGS. 1 through 5, the housing 12 has: (a) a perimeter wall 106 substantially lying in a single plane, providing the electronic device 10 with a relatively flat notebook-type configuration; (b) a front inner wall 108 defining a window, opening or input assembly space 110; (c) a rear side 112; and (d) a plurality of shaft supports 114 and 116. The input assembly space 110 provides an open area for the rotational movement of the input assembly 16. In one embodiment, the space 110 is a recess rather than an opening that passes entirely through the electronic device 10. In another embodiment, the space 110 is an opening that passes entirely through the electronic device 10. In either embodiment, the rear side 112 of the housing 12 has one or more hang mount devices 118. Each hang mount device 118 has a mount wall 120 that defines an mount opening 122 to receive a head or other portion of a fastener, such as the head of a screw. The rear side 112 also has a battery door or cover 124 and a battery cover release device 126. In one embodiment, the shaft supports 114 and 116 define shoulders or openings which receive or otherwise rotatably support shafts 46 and 48, respectively, of the input assembly 16.

In operation of one example, the user screws a plurality of mounting screws (not shown) into a room wall 11, such as a kitchen or hospital wall. The user then engages the hang mount devices 118 by inserting the heads of the screws into the mount openings 122. In doing so, the user mounts the electronic device 10 to the room wall 11. If the rechargeable battery unit 163 (described below with respect to FIG. 15) is charged, the user can operate the electronic device 10 at this point. Alternatively, the user can obtain power for the electronic device 10 (and charge the battery unit) by connecting the power cord 128 to a nearby electrical outlet 130. In either case, the user connects the electronic device 10 to the Internet using the built-in transceiver 34 or using a data cable (not show) connected to a data outlet.

In one embodiment, the electronic device 10 is a kiosk-type machine mounted to the wall of a public facility, such as an airport or train station. Here, the electronic device 10 includes a data card reader and a payment acceptor, such as a coin slot or bill receiver. The user can operate the device 10 for a designated amount of time after funding the device 10.

1.2 Magnetic Mount Housing

For the magnetic computer or electronic device 100 illustrated in FIGS. 6 through 9, the housing 102 has: (a) a perimeter wall 132 substantially lying in a single plane, providing the electronic device 100 with a relatively flat notebook-type configuration; (b) a front inner wall 134 defining a window, opening or input assembly space 136; (c) a rear side 138; and (d) a plurality of shaft supports 140 and 142. The input assembly space 136 provides an open area for the rotational movement of the input assembly 16. In one embodiment, the space 136 is a recess rather than an opening that passes entirely through the electronic device 100. In another embodiment, the space 136 is an opening that passes entirely through the electronic device 100. In either embodiment, the rear side 138 of the housing 102 has one or more magnets, magnetic layers or magnetic members, such as the substantially flat magnet 144. The magnet 144 is integrated with or fastened to the surface of the rear side 132. In one embodiment, the magnet 144 is adhered to the surface of the rear side 132 using a suitable adhesive. The rear side 132 also has a battery door or cover 146 and a battery cover release device 148. In one embodiment, the shaft supports 140 and 142 define shoulders or openings which receive or otherwise rotatably support shafts 46 and 48, respectively, of the input assembly 16.

In operation of one example, the user removably attaches and mounts the magnetic electronic device 100 to a metallic surface, such as a refrigerator 101, by bringing the rear side 138 into contact with the metallic door 150 of the refrigerator 101. If the rechargeable battery unit 163 (described below with respect to FIG. 15) is charged, the user can operate the electronic device 100 at this point. Alternatively, the user can obtain power for the electronic device 10 (and charge the battery unit) by connecting a power cord (not shown) of the electronic device 100 to a nearby electrical outlet or to a refrigerator electrical source. In either case, the user can connect the electronic device 100 to the Internet using the built-in transceiver 34 or using a data cable (not show) connected to a data outlet.

1.3 Electronic System

Figure 15:
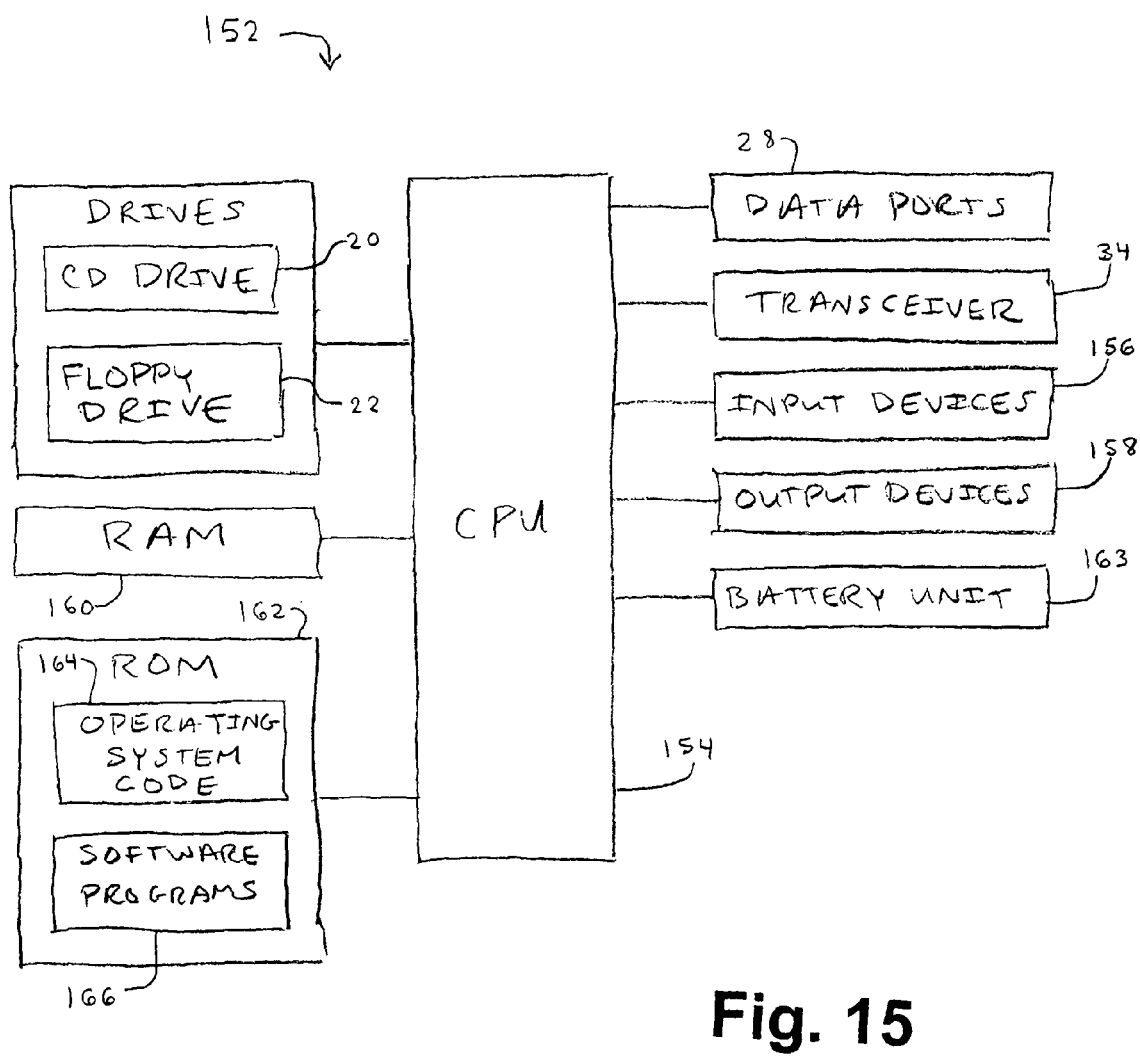
FIG. 15 is a schematic block diagram illustrating the electronic configuration or electronic system in one embodiment.

In one embodiment, the computers or devices 10 and 100 each have the computer system or electronic system 152 illustrated in FIG. 15. The electronic system 152 includes: (a) a central processing unit or processor 154 which is electronically coupled to the CD drive 20, floppy device 22, data ports 28, transceiver 34, input devices 156 and output device 158; (b) Random Access Memory (RAM) 160 electronically coupled to the processor 154; (c) Read Only Memory (ROM) 162 electronically coupled to the processor 154; and (d) a rechargeable battery unit 163 operatively coupled to the processor 154. The input devices 156 include the input assembly 16, power button 24 and control buttons 30. The output devices 158 include the display device 14, supplementary display device 56, status indicators 26 and speakers 32.

The ROM 162 includes computer-readable instructions which determine the operational activities of the processor 154. In one embodiment, the ROM 162 includes operating system code 164 associated with a suitable operating system. The ROM 162 also includes a plurality of software programs 166 usable by the processor 154 to run various applications, such as word processing applications, Internet browser applications, finance applications, business applications and entertainment applications.

2. In-Console Electronic Device

Figure 16:
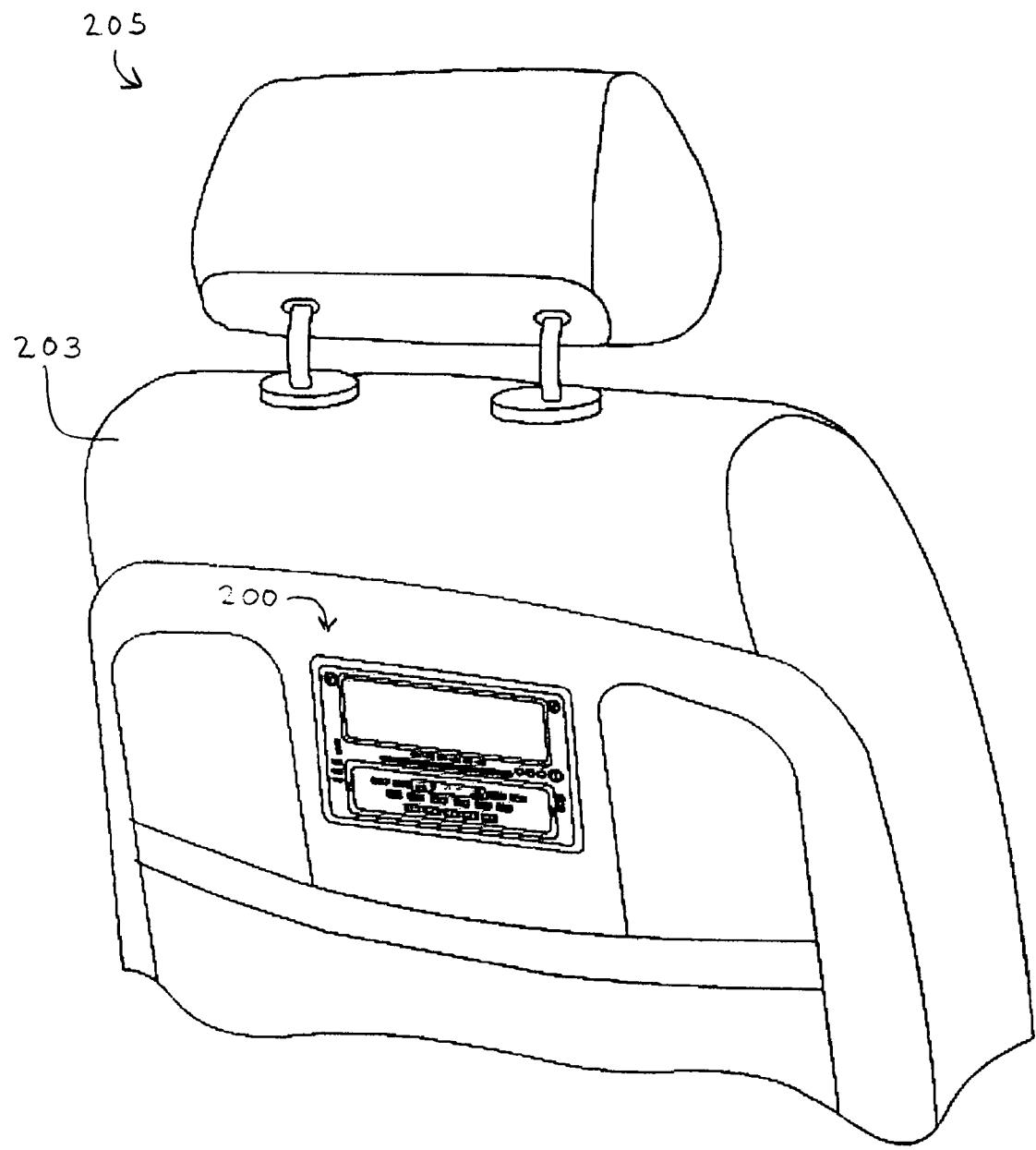
FIG. 16 is a perspective view of the in-console electronic device mounted within a vehicle seat in one embodiment.
Figure 17:
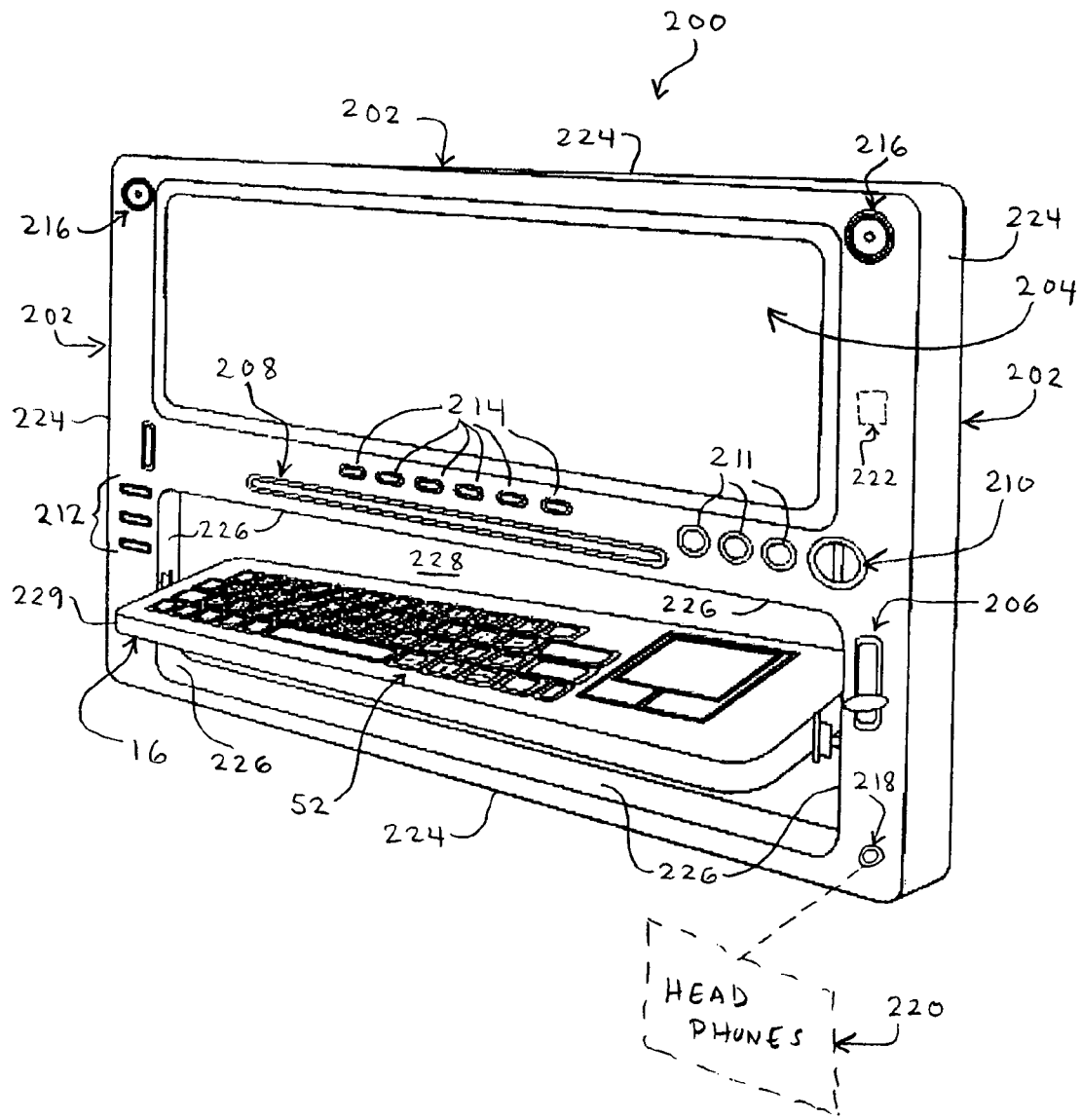
FIG. 17 is a front perspective view of the in-console electronic device of FIG. 16.
Figure 18:
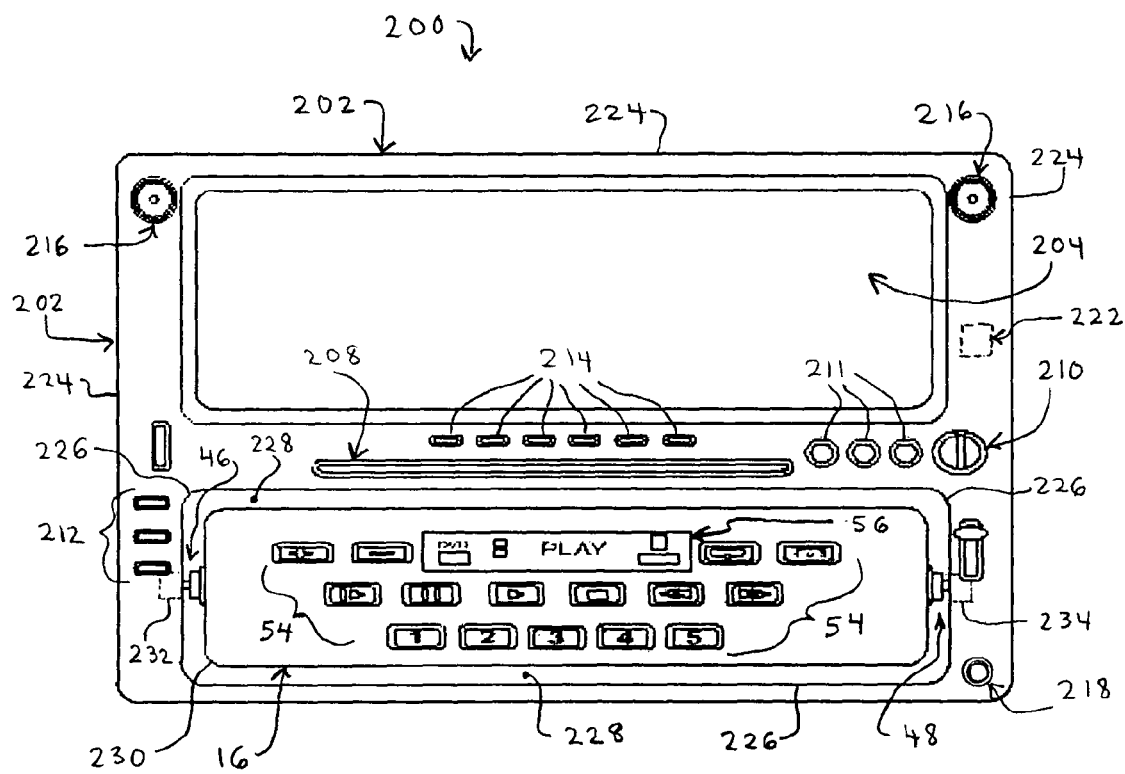
FIG. 18 is a front elevation view of the in-console electronic device of FIG. 16, illustrating the input side of the input assembly.
Figure 19:
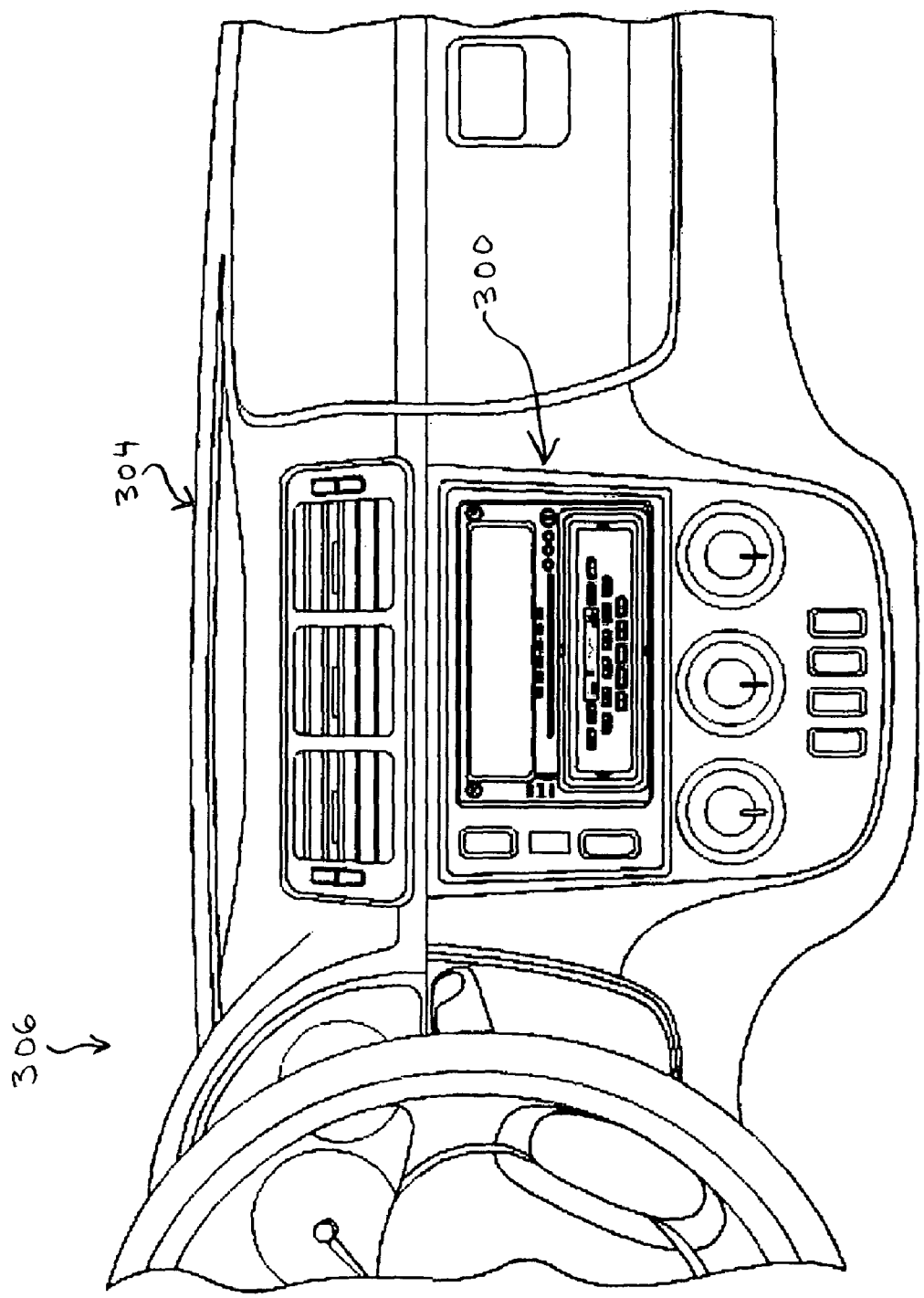
FIG. 19 is a front perspective view of the in-vehicle electronic device mounted within a dashboard of a vehicle in one embodiment.
Figure 20:
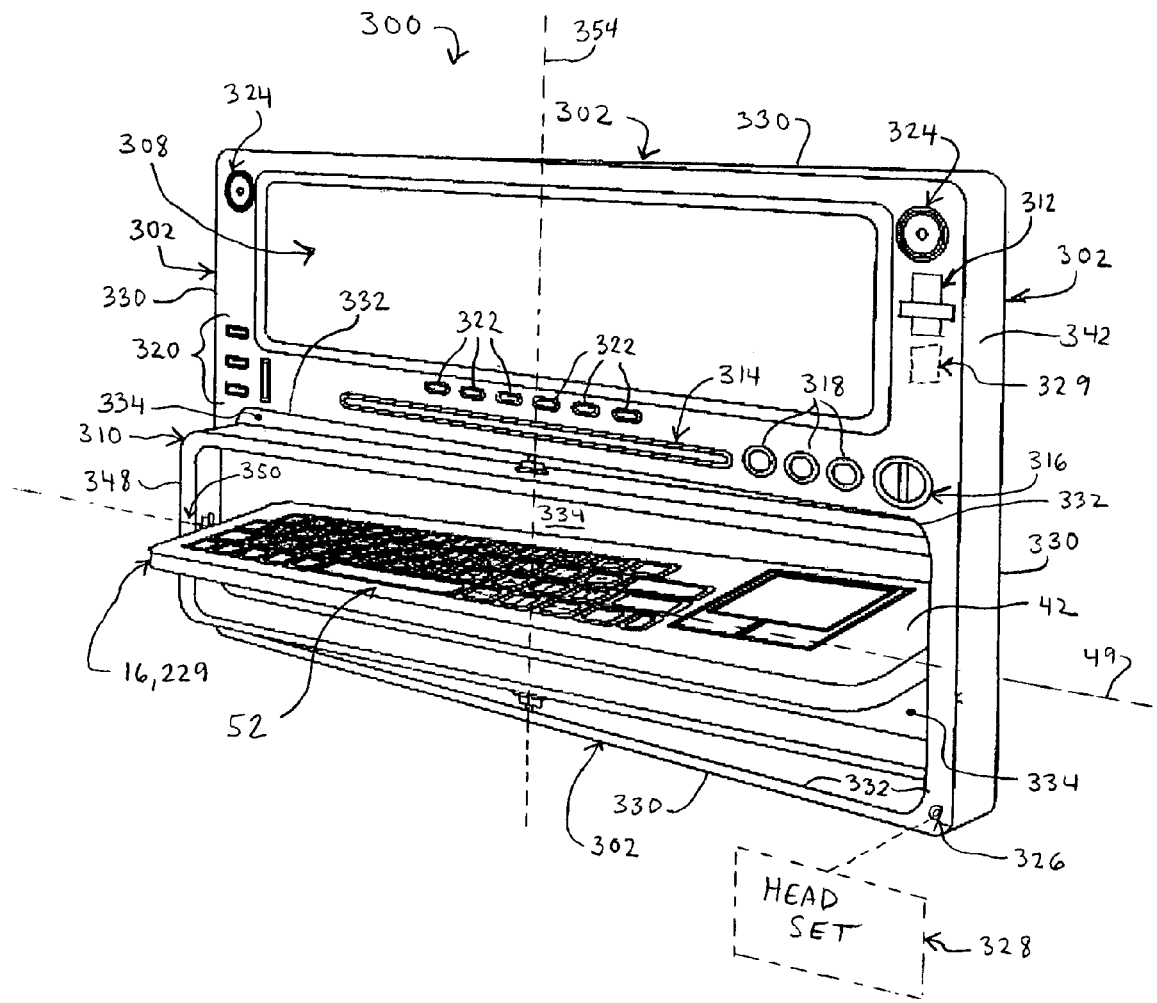
FIG. 20 is a front perspective view of the in-vehicle electronic device of FIG. 19, illustrating the multi-axis rotational functionality of the input assembly.
Figure 21:
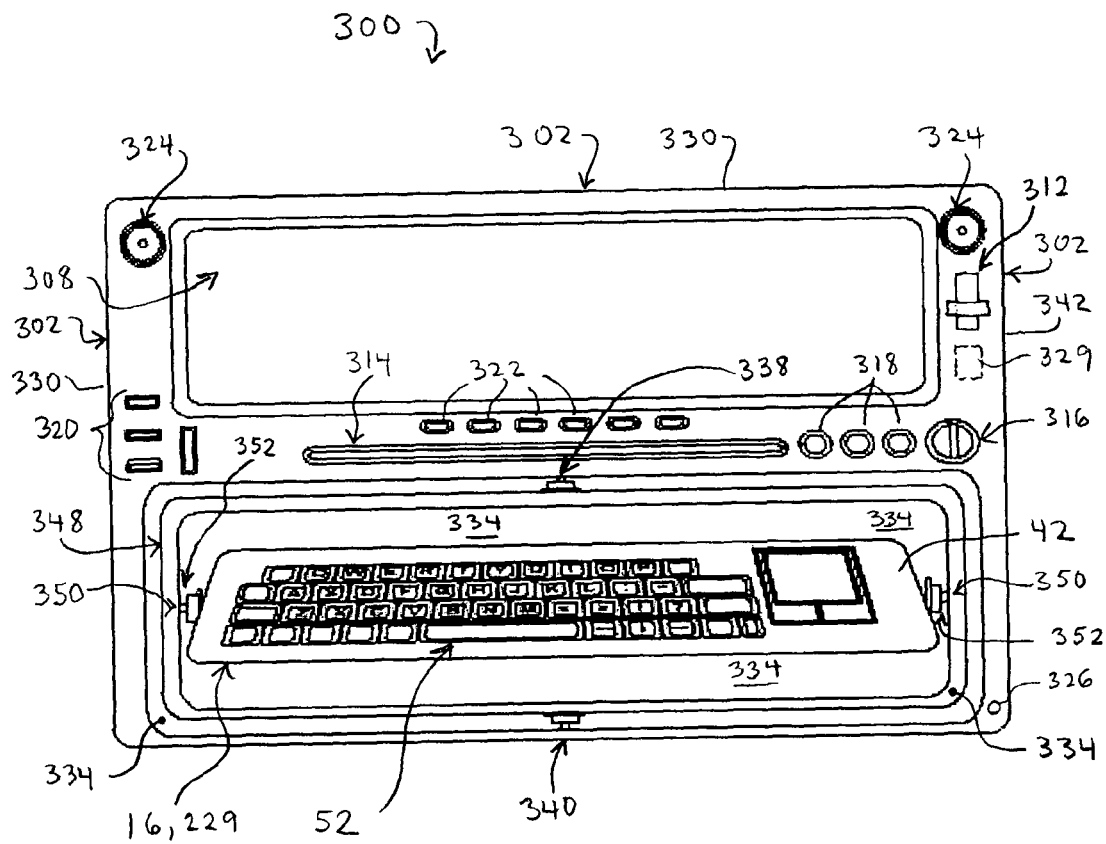
FIG. 21 is a front elevation view of the in-vehicle electronic device of FIG. 19, illustrating the data entry side of the input assembly.
Figure 22:
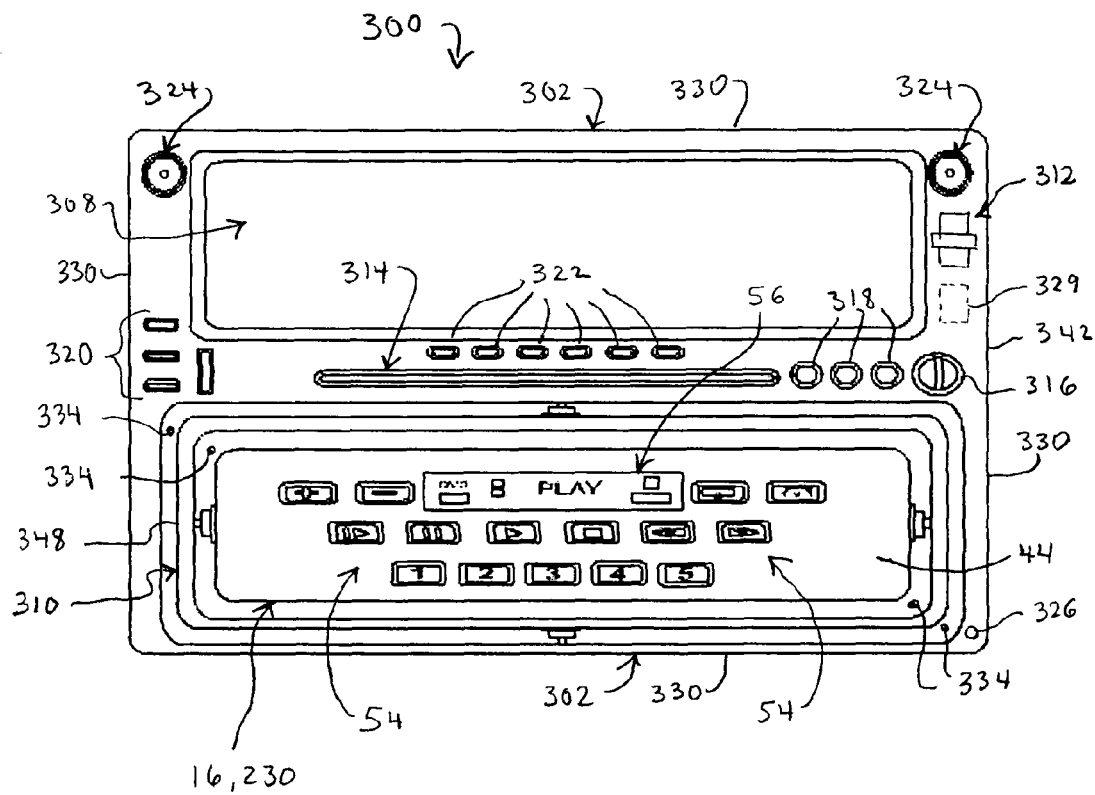
FIG. 22 is a front elevation view of the in-vehicle electronic device of FIG. 19, illustrating the input side of the input assembly.

Referring to FIG. 16 through 18, the in-console computer or electronic device 200, in one embodiment, includes: (a) a chassis or housing 202 mounted, in the illustrated example, within the backside 203 of a vehicle seat 205; (b) a monitor, screen or display device 204 supported by the housing 202, such as the substantially flat Liquid Crystal Diode (LCD) screen illustrated in the figures; (c) the input assembly 16 (described above) rotatably coupled to the housing 202; (d) a position control device 206 operatively coupled to the input assembly 16; (e) a compact disk drive 208; (f) a power button 210 and a plurality of different status indicators 211, such as Light Emitting Diodes (LEDs), operable to visually indicate the status of various operational parameters of the electronic device 200; (f) a plurality of data exchange devices or data ports 212 operable to couple external devices (such as flash memory sticks or removably data storage devices, printers, scanners and Personal Digital Assistants (PDAs)) to the electronic device 200 through use of a data cable, cord or connector; (g) a plurality of control buttons 214 operable to provide inputs for controlling settings for the display device 204 and performance settings for the electronic device 200; (h) a plurality of sound output devices or speakers 216 operable to output music and other sounds; (i) at least one phone or headset audio output port 218 which enables a user to connect speakers or head phones 220 to the electronic device 200; and j) a signal receiving and transmitting device 222, such as a radio frequency (RF) transceiver, which wirelessly couples the processor 154 of the electronic system 152 to a data network, such as the Internet.

The housing 202 houses or otherwise supports suitable circuitry components, hardware and software, such as the electronic system 152 described above with respect to FIG. 15. The housing 202 has: (a) a perimeter wall 224 substantially lying in a single plane, providing the electronic device 200 with a relatively flat configuration; (b) a front inner wall 226 defining a window, opening or input assembly space 228; (c) a rear side 230; and (d) a plurality of shaft supports 232 and 234. The perimeter wall 224 has a console or seat engagement surface 226 which engages an inner portion of the seat 205. The input assembly space 228 provides an open area for the rotational movement of the input assembly 16. In one embodiment, the space 228 is a recess rather than an opening that passes entirely through the electronic device 200. In another embodiment, the space 228 is an opening that passes entirely through the electronic device 200. In either embodiment, the rear side of the housing 102 has one or more mount devices (not shown) which are operable to mount the housing 202 within a console or structure, such as the vehicle seat 205. In one embodiment, at least one of these mount devices includes a mount bracket or mount plate which defines a plurality of mount holes (not shown). The mount plate can be attached to the inner portion of the seat 205 with fasteners, bolts or screws that extend through the mount holes. This mount device also includes a coupling member which secures the housing 202 to the mount plate through a slidable, press-fit, rotary or fastener connection.

In one embodiment, the rear side (not shown) defines one or more wire holes or wire openings which enable electrical cords, wires or data cables to extend from the inside of the housing 202 to an electrical or computer system reachable within the seat 205. In another embodiment, the housing 202 includes a plurality of electrical or electronic contact devices, such as electrical harnesses, connected to the rear side 230. These contact devices are configured to removably mate with electrical or electronic contact devices or harnesses located within the seat 205. In one embodiment, the shaft supports 232 and 234 define shoulders or openings which receive or otherwise rotatably support shafts 46 and 48, respectively, of the input assembly 16. In one embodiment, the in-console electronic device 200 has the electronic system 152 having the audio output port 218 coupled to the processor 154.

In operation of one example, for each of the devices 10, 100, and 200, the user can operate the keyboard 52 for data entry purposes. The user can use the keyboard 52 to perform any personal computer activity or task, such as writing a letter, balancing a checkbook, composing and sending an email, paying bills online or surfing the World Wide Web portion of the Internet. To use the keyboard 52, the user unlocks the input assembly 16 using the position control device 18. Next, the user rotates the input assembly 16 from one position 229 to another position 230 where the keyboard 52 can be operated. In each of the positions 229 and 230, the input assembly 16 is parallel to or substantially parallel to the screen of the display device. The user can rotatably adjust the input assembly 16 until reaching a typing angle which is comfortable and ergonomically suitable to the user. When finished typing, the user can rotate the input assembly 16 back to the position 229 where the input side 44 faces outward. At this point, the user an perform a variety of functions by monitoring the supplementary display device 56 and activating the supplementary input devices or supplementary input devices 54, as described above. In one embodiment, the input assembly 16 is rotatable or spinnable in a drum-like fashion through three-hundred sixty degrees.

3. In-Vehicle Electronic Device

Referring to FIG. 19 through 23, the in-vehicle computer or electronic device 300, in one embodiment, includes: (a) a chassis or housing 302 mounted, in the illustrated example, within the dashboard 304 of a vehicle 306; (b) a monitor, screen or display device 308 supported by the housing 302, such as the substantially flat Liquid Crystal Diode (LCD) screen illustrated in the figures; (c) the input assembly 16 described above; (d) an input assembly holder 310 rotatably coupled to the housing 302; (e) a position control device 312 operatively coupled to the input assembly 16; (f) a compact disk drive 314; (g) a power button 316 and a plurality of different status indicators 318, such as Light Emitting Diodes (LEDs), operable to visually indicate the status of various operational parameters of the electronic device 300; (h) a plurality of data exchange devices or data ports 320 operable to couple external devices (such as flash memory sticks or removably data storage devices, printers, scanners and Personal Digital Assistants (PDAs)) to the electronic device 300 through use of a data cable, cord or connector; (i) a plurality of control buttons 322 operable to provide inputs for controlling settings for the display device 308 and performance settings for the electronic device 300; (j) a plurality of sound output devices or speakers 324 operable to output music and other sounds; (k) at least one phone or headset audio output port 326 which enables a user to connect an audio input-output headset 328 (such as a microphone and ear speaker assembly) to the electronic device 300; (l) a signal receiving and transmitting device (not shown), such as a radio frequency (RF) transceiver, which wirelessly couples the processor of the electronic system 152 to a data network, such as the Internet; and (m) computer programmed safety module or an electronic safety device 329 which operatively couples the electronic device 300 to the vehicle ignition or a designated vehicle drive mode, thereby causing the electronic device 300 or the input assembly 16 to be in off mode or inoperable when the vehicle 306 is on or in a designated mode of operation. In one embodiment, this safety device 329 causes the electronic device 200 to shut down when the user pivots the input assembly 16 toward the driver's seat while the vehicle 306 is in a designated mode of operation.

Figure 23:
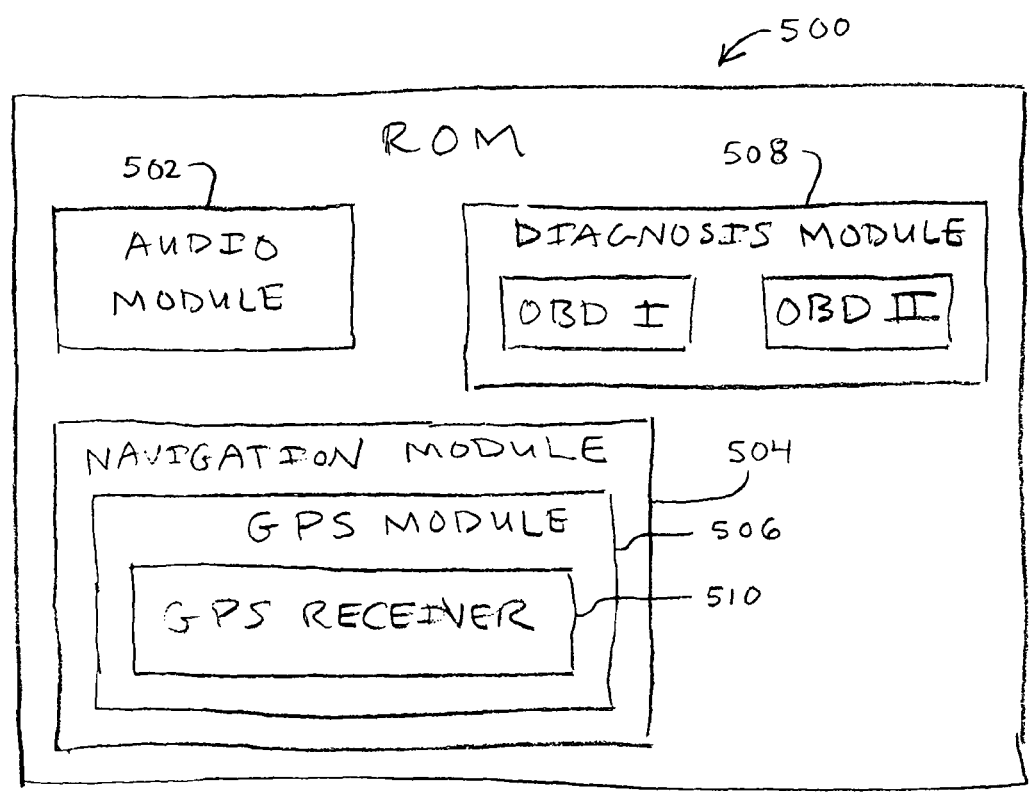
FIG. 23 is a schematic block diagram of the Read Only Memory (ROM) of the electronic device of FIG. 19 in one embodiment.

The housing 302 houses or otherwise supports suitable circuitry components, hardware and software, such as the electronic system 152 except that the ROM 162 is replaced with ROM 500 illustrated in FIG. 23. ROM 500 includes a plurality of vehicle-related software programs or computer code, including, without limitation: (a) vehicle or car audio code or module 502 which directs the processor 152 to control the audio system of the vehicle 306; (b) navigation code or navigation module 504 which includes global positioning satellite (GPS) code or a GPS module 506; and (c) car or vehicle diagnosis code or diagnosis module 508 enabling technicians to diagnosis and trouble shoot problems with the vehicle 306 through use of the electronic device 300.

The GPS module 506 includes a GPS receiver 510. The GPS receiver 510 has an antenna (not shown) to receive signals from a satellite network and obtain the longitude, latitude and altitude of the vehicle 306. The processor 154 causes the display device 308 to display a graphical map. The map is usable to provide positioning and navigational functions for the vehicle 306.

The diagnosis module 506 includes an on-board diagnostics (OBD) module 508, such as OBD I and OBD II of the U.S., for analyzing performance of the vehicle's engine, transmission, fuel system and other components. In one embodiment, the electronic device 300 is programmed to enable technicians, drivers and other users to diagnose the vehicle 306 using the input assembly 16 and display device 308.

Referring back to FIGS. 20 through 22, the housing 302 of the electronic device 300 has: (a) a perimeter wall 330 substantially lying in a single plane, providing the electronic device 330 with a relatively flat configuration; (b) a front inner wall 332 defining a window, opening or input assembly space 334; (c) a rear side (not shown); and (d) a plurality of shaft supports 338 and 340. The perimeter wall 330 has a console or dashboard engagement surface 342 which engages an inner portion of the dashboard 304. The input assembly space 334 provides an open area for the rotational movement of the input assembly holder 310. In one embodiment, the space 334 is a recess rather than an opening that passes entirely through the electronic device 300. In another embodiment, the space 334 is an opening that passes entirely through the electronic device 300.

In either embodiment, the rear side of the housing 302 has one or more mount devices (not shown) which are operable to mount the housing 302 within the dashboard 304 of the vehicle 306. In one embodiment, at least one of these mount devices includes a mount bracket or mount plate which defines a plurality of mount holes (not shown). The mount plate can be attached to the inner portion of the dashboard 304 with fasteners, bolts or screws that extend through the mount holes. This mount device also includes a coupling member which secures the housing 302 to the mount plate through a slidable, press-fit, rotary or fastener connection.

In one embodiment, the rear side defines one or more wire holes or wire openings which enable electrical cords, wires or data cables to extend from the inside of the housing 302 to an electrical or computer system reachable within the dashboard 304. In another embodiment, the housing 302 includes a plurality of electrical or electronic contact devices, such as electrical harnesses, connected to the rear side 336. These contact devices are configured to removably mate with electrical or electronic contact devices or harnesses located within the dashboard 304. In one embodiment, the shaft supports 338 and 340 define shoulders or openings which receive or otherwise rotatably support shafts 344 and 346, respectively, of the input assembly holder 310.

The input assembly holder 310 includes: (a) a support or frame 348 sized to surround the input assembly 16; (b) a plurality of side coupler supports of shaft supports 350 which rotatably couple the input assembly 16 to the frame 348; (c) and a plurality of couplers or shafts 352 which pivotably or rotatably couple the frame 348 to the inner wall 332 of the housing 302. In operation, the input assembly 16 is rotatable about a horizontal axis 49 through a designated angle or through three hundred sixty degrees. In addition, the input assembly holder 310 is pivotable or rotatable about vertical axis 354 which intersects with and, in the illustrated embodiment, is perpendicular to the axis 49. The input assembly holder 310 is pivotable or rotatable about the vertical axis 354 through a designated angle or through three hundred sixty degrees. In the illustrated embodiment, the driver can pivot the input assembly 16 (about vertical axis 354) toward his/her seat, and then the driver can rotate the input assembly 16 (about the horizontal axis 49) to a desired position for typing on the keyboard 52 or using the supplementary control input devices 54. Likewise, the front seat passenger can pivot the input assembly 16 (about vertical axis 354) toward his/her seat, and then the front seat passenger can rotate the input assembly 16 (about axis 49) to a desired position for typing on the keyboard 52 or using the supplementary control input devices 54. As such, the input assembly holder 310 provides the input assembly 16 with at least two degrees of pivotal or rotational freedom—side to side rotational freedom and upward/downward rotational freedom.

4. Electronic Notebook

Figure 24:
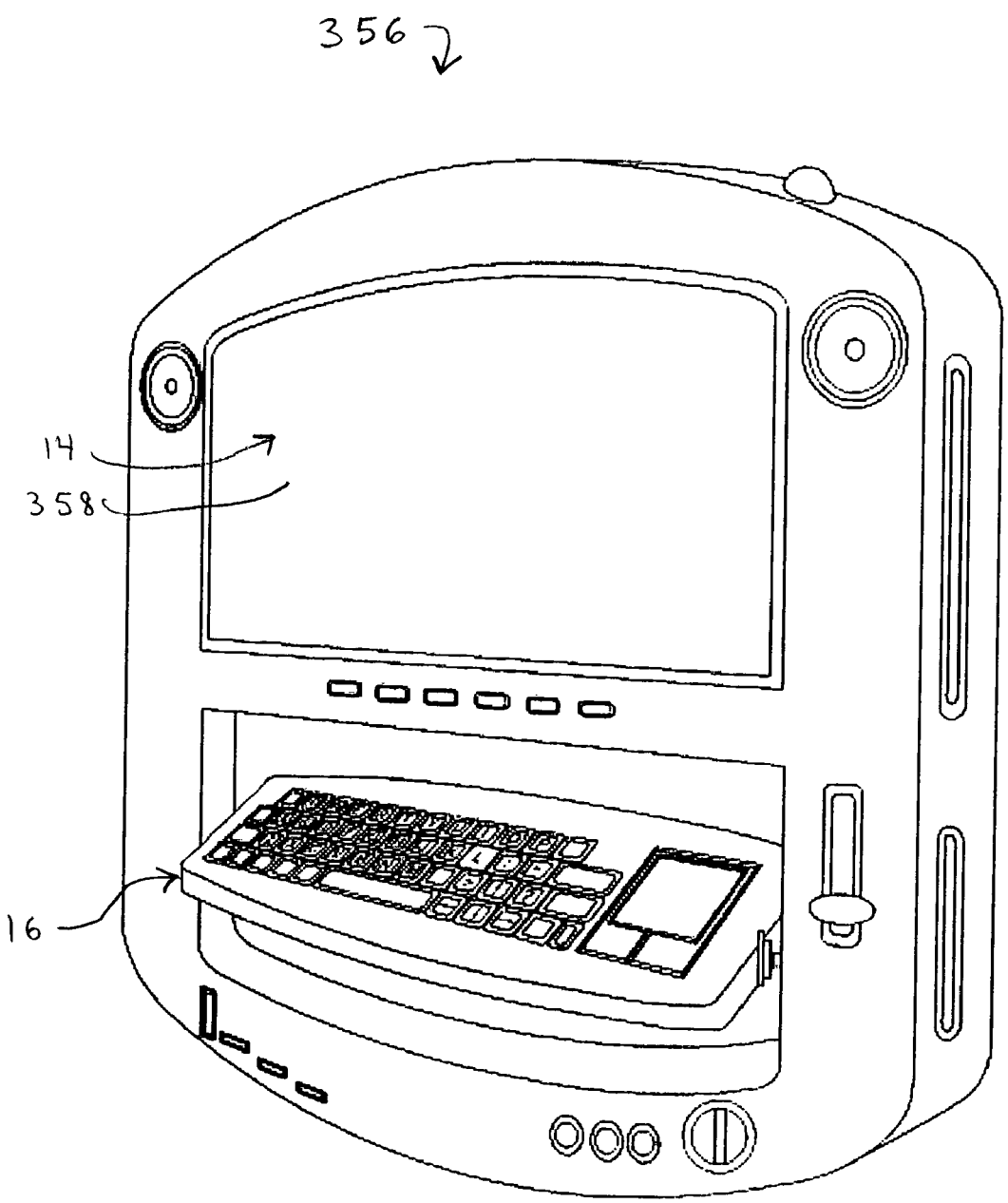
FIG. 24 is a front perspective view of the electronic notebook in one embodiment.

Referring to FIG. 24, the computer notebook or electronic notebook 356, in one embodiment, includes the structure, components and functionality of the electronic device 100 except the electronic notebook: (a) does not include the magnetic member 144; and (b) includes a touch screen module or device 358 within the display device 14. As such, the electronic notebook 356 is a portable and mobile personal computer with a substantially integral and flat configuration. While supporting the notebook 356 on a table or other support surface, the user can use the input device 16 to enter data or make other inputs. Optionally, the user can use the display device 14 to enter data and provide inputs to the notebook 356.

5. Hand-Held Mobile Devices

5.1 Phone/PDA Module

Referring to FIGS. 25 through 32, the mobile phone, PDA or communication device 600, in one embodiment, includes: (a) a chassis or housing 602; (b) a display device 604, such as an LCD screen, supported by the housing 602; (c) a touch actuation device (not shown) coupled to the display device 604; (d) the input assembly 16 having a size suitable for being positioned within the space 605 defined by the inner wall 606 of the housing 602; (e) an audio input device or microphone 608; (f) an ear audio output device or ear speaker 610; (g) an audio output device or loud speaker 612; (h) an audio input/output jack or audio port 614 connectable to a headset wire or cord; (i) data port 613; (j) a light source (not shown) coupled to the input assembly 16 and operable to illuminate the input assembly 16; (k) a receiving and transmitting device or transceiver which wirelessly couples the communication device 600 to a data network, enabling the communication device 600 to wirelessly exchange communication signals and data with other devices operating on such network; (l) a removable rechargeable battery which is operable to power the communication device 600; (m) a processor and memory device coupled to the processor; and (n) a communication and data processing module or code stored by the memory device.

Figure 25:
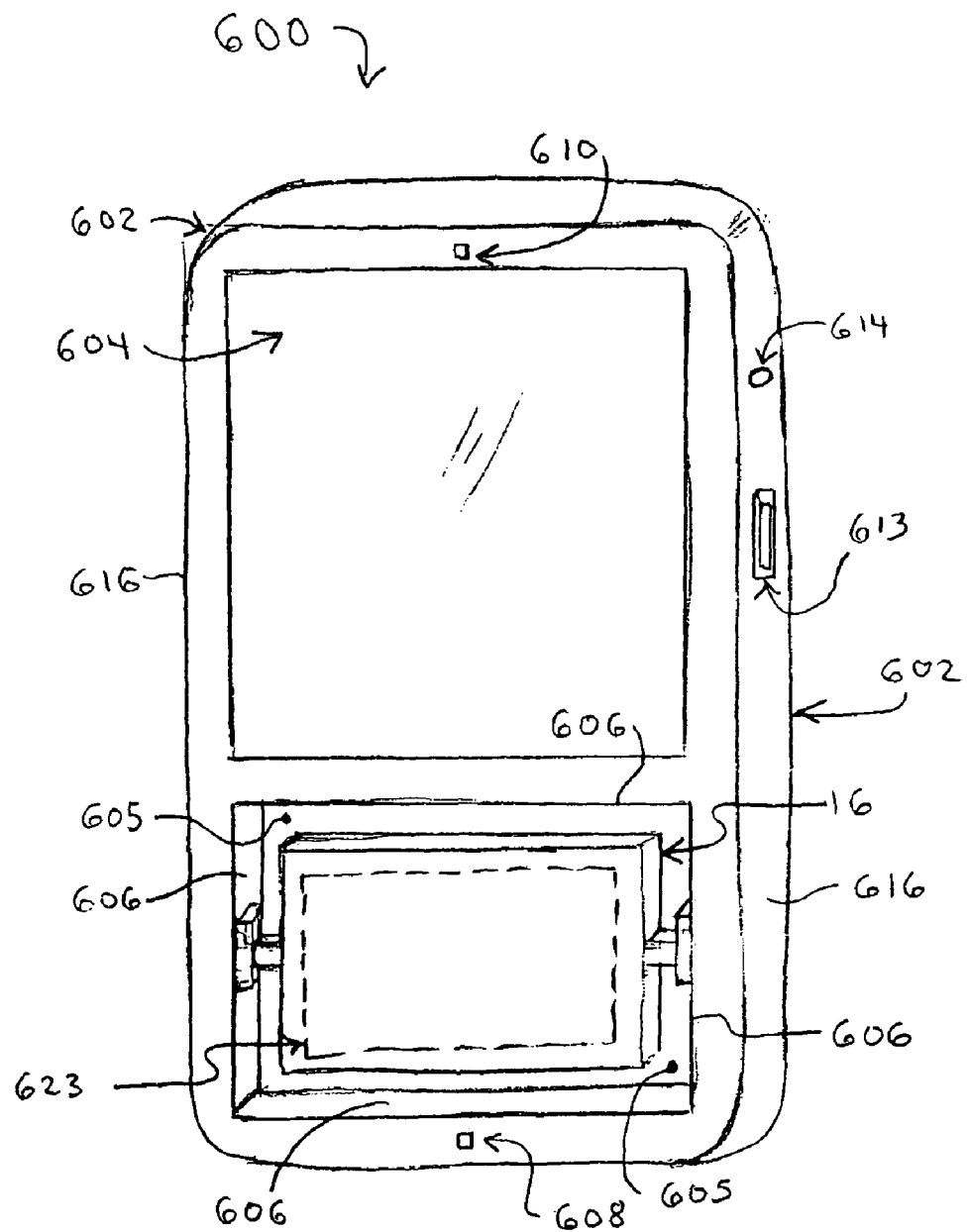
FIG. 25 is a front perspective view of the communication device in one embodiment.
Figure 26:
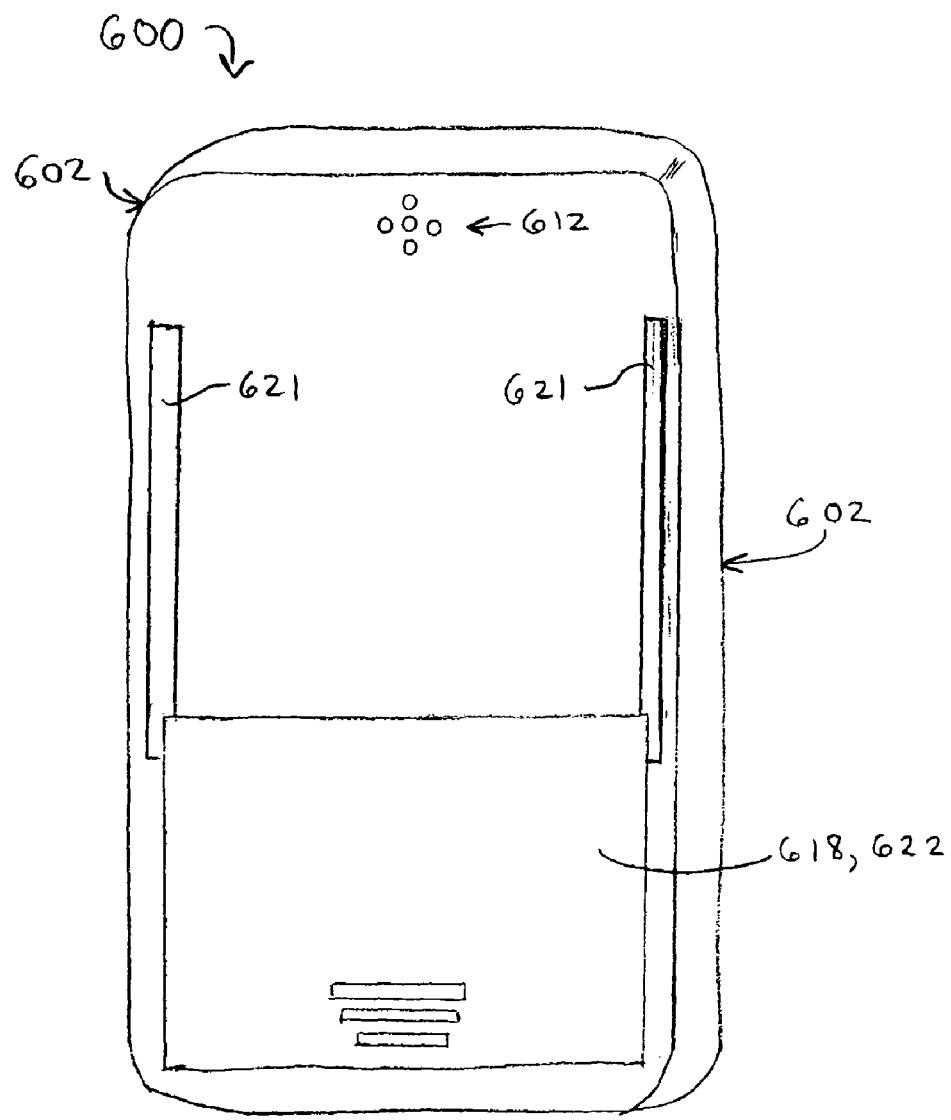
FIG. 26 is a rear perspective view of the communication device of FIG. 25, illustrating the rear cover in a closed position.
Figure 27:
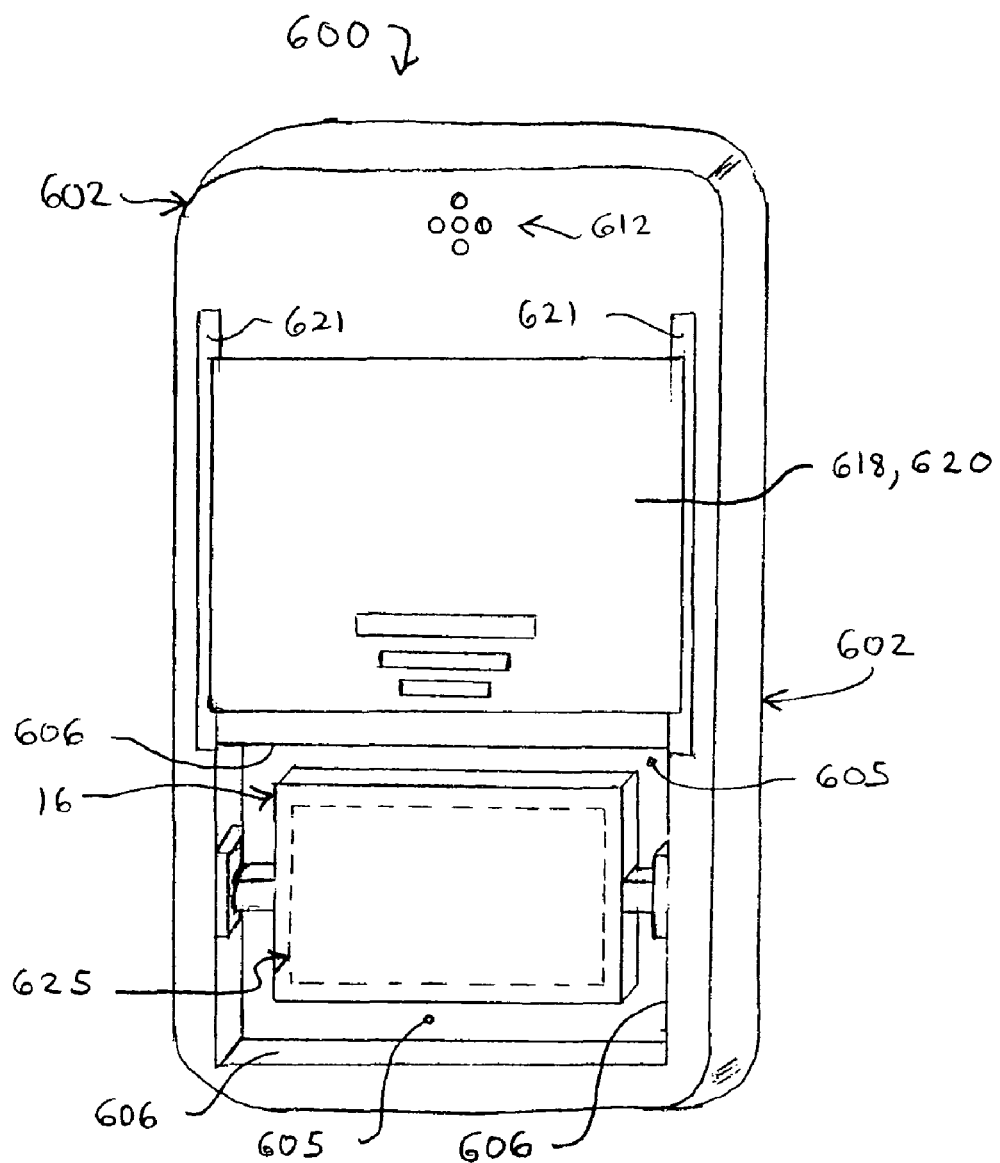
FIG. 27 is a rear perspective view of the communication device of FIG. 25, illustrating the rear cover in an open position.
Figure 28:
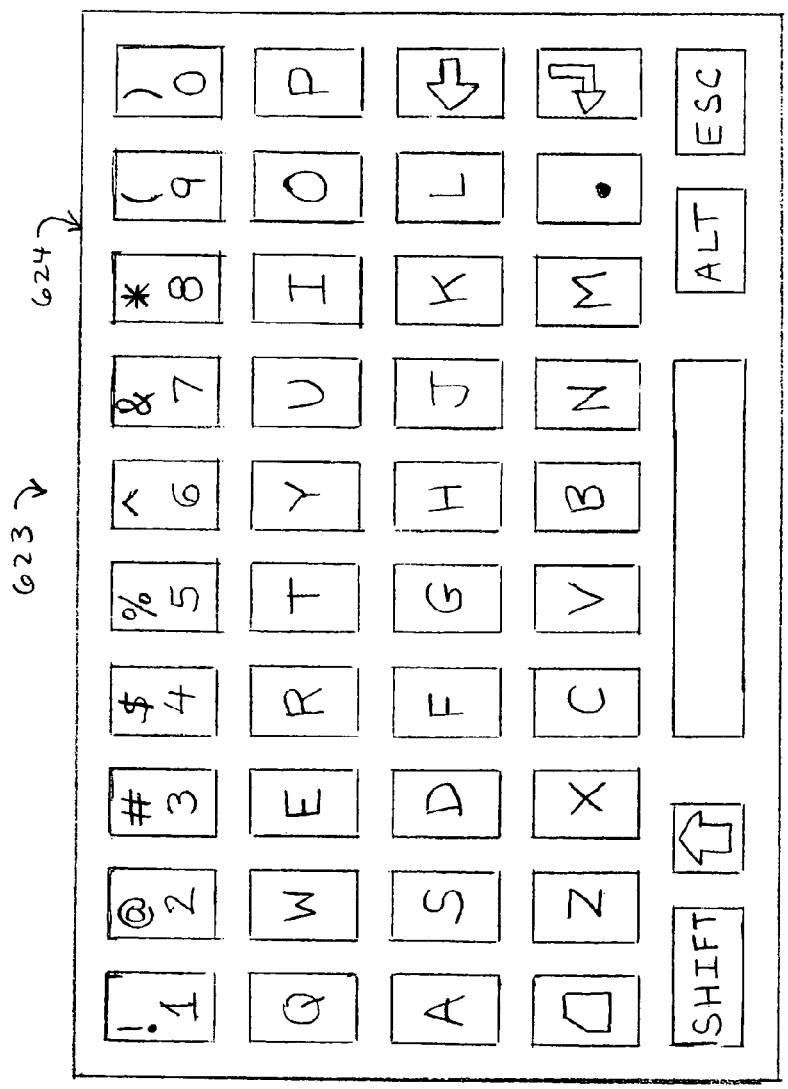
FIG. 28 is a top plan view of the data entry side of the communication device of FIG. 25 in one embodiment.
Figure 29:
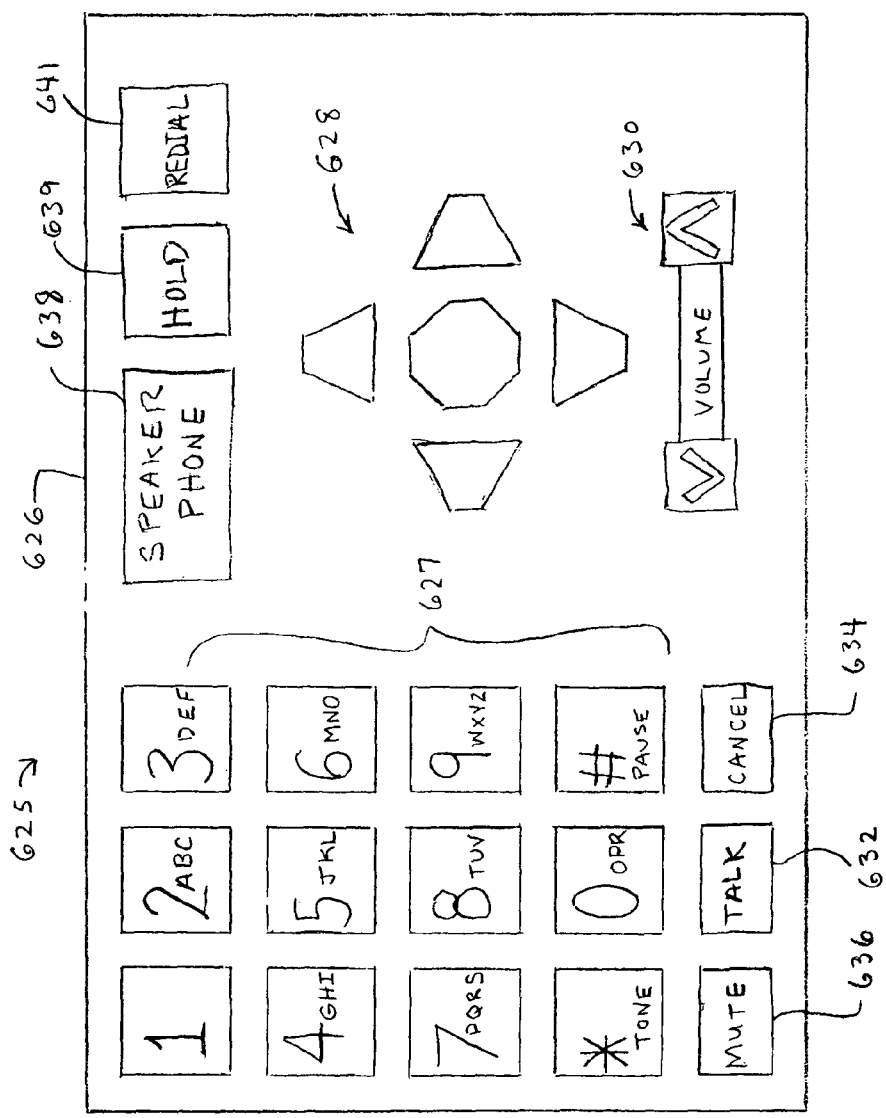
FIG. 29 is a top plan view of the telephone side of the communication device of FIG. 25 in one embodiment.

In the illustrated embodiment, the space 605 passes entirely through the housing walls 616. The movable rear panel, door or cover 618 is slidable between an open position 620 and a closed position 622 through slots 621. As illustrated in FIGS. 25 and 28, the data entry side 623 of the input assembly 16 supports or carries a keyboard 624. The telephone side 625 of the input assembly 16 supports or carries a telephone control panel 626, as illustrated in FIGS. 27 and 29. The telephone control panel 626 includes: (a) a standard telephone keypad 627 having the standard telephonic alphanumeric convention or system; (b) a multi-directional curser mover 628; (c) a volume control device 630; and (d) a plurality of telephone control-related buttons including a connect button 632, disconnect button 634, mute button 636, speaker phone button 638, hold button 639 and redial button 641.

Figure 30:
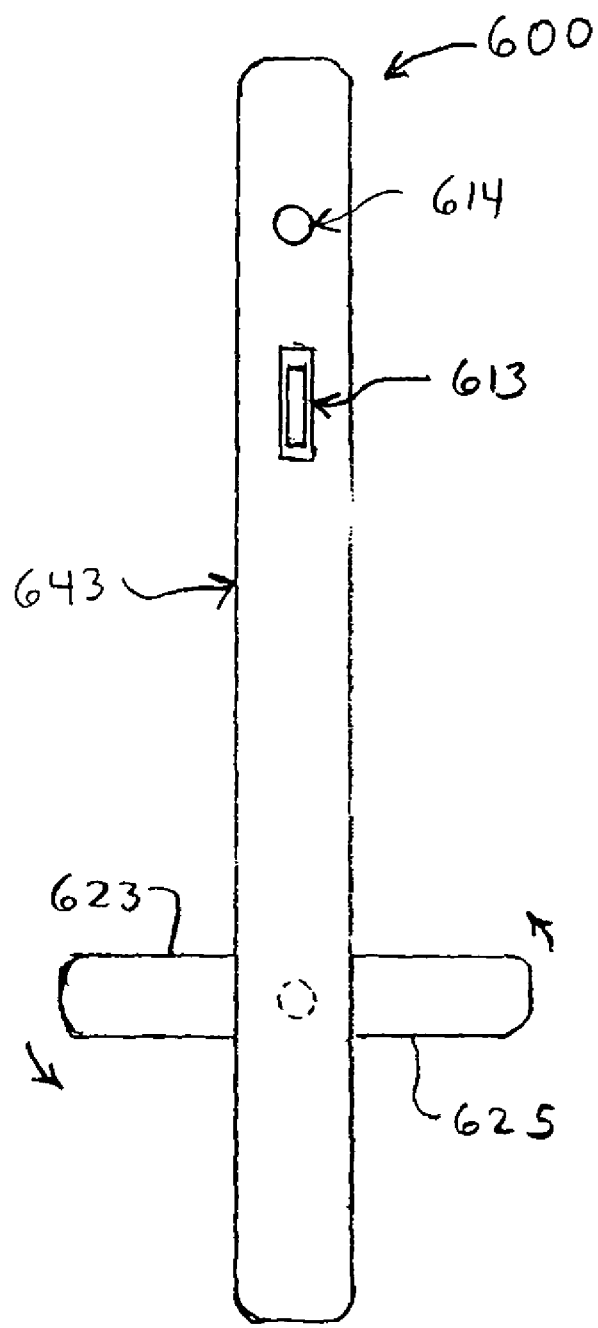
FIG. 30 is a side elevation view of the communication device of FIG. 25, illustrating the rotatable function of the input assembly.

As illustrated in FIG. 30, the user can rotate the input assembly 16 to switch between using the phone functionality and data processing functionality of the communication device 600. In one example, the user first slides the cover 618 upward to its open position 620. Opening the cover 618 provides room or openness for the input assembly 16 to freely rotate. This enables the user to rotate the input assembly 16 through one hundred eighty or three hundred sixty degrees, as illustrated in FIG. 30. When the user has positioned the desired side 623 or 625 at the front 643 of the communication device 600, the user closes the cover 618. The closing of cover 618 guards the space 605 from debris and also guards the input assembly 16 against damage by foreign objects.

5.2 Game Play Module

Figure 31:
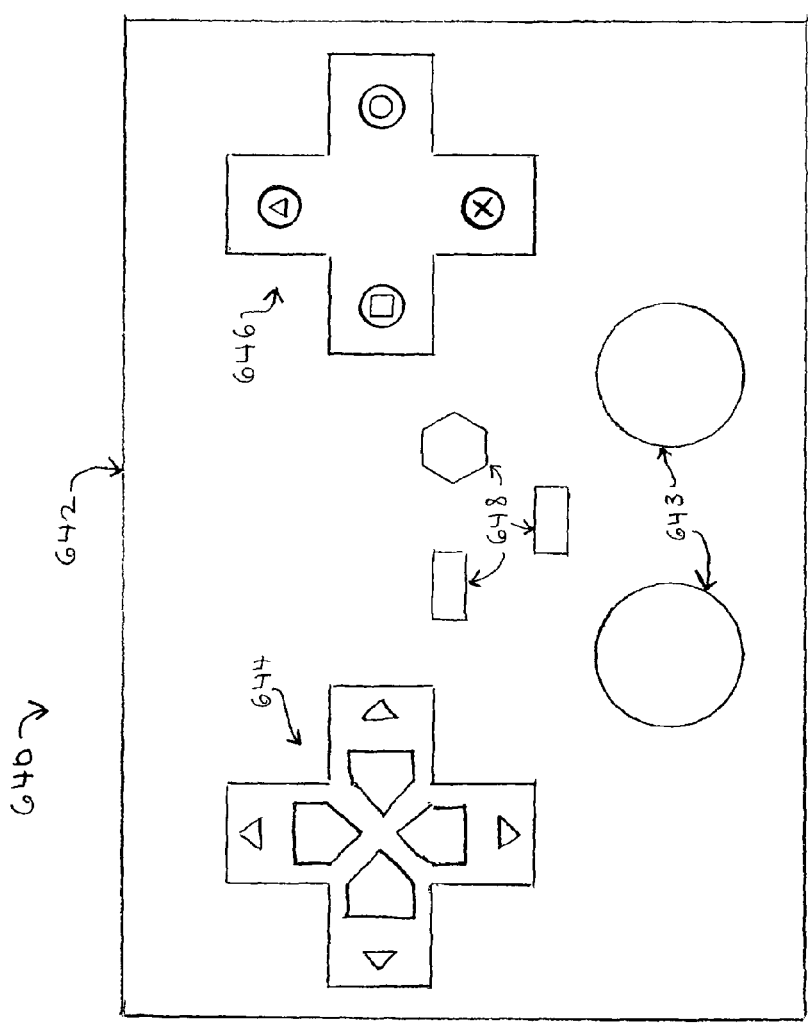
FIG. 31 is a top plan view of the game side of the communication device of FIG. 25 in one embodiment.

Referring to FIG. 31, in one embodiment, the communication device 600 has a game play module used by the processor of the communication device 600. Here, the communication device 600 stores or accesses a plurality of game programs which are accessible to the device 600 through a wire-based or wireless connection to an electronic game program source, such as a personal computer or webserver. In this embodiment, one side (not shown) of the input assembly 16 supports or carries keyboard 626, keypad 626, telephone control panel 626 or any suitable combination thereof.

The opposite, game side 640 supports or carries a game control panel 642. The game control panel 642 includes: (a) a plurality of relatively flat-configured joysticks 643; (b) a multi-directional pad 644 enabling the user to control the upward, downward, left and right movement or travel of a character or game-related image displayed by the display device 604; (c) a command pad 646 having a plurality of command buttons associated with different game commands, for example, jump, shoot, fly or run; and (d) a plurality of general game play buttons 648, for example, a start button, mode button, pause button, repeat button or select button. The user can use one side of the input assembly 16 to operate keyboard 624, telephone control panel 626, keypad 627 or any suitable combination thereof. When ready for games, the user can rotate the input assembly 16 one hundred eighty degrees and use the game side 640 to operate the game control panel 642.

5.3 Entertainment Module

Figure 32:
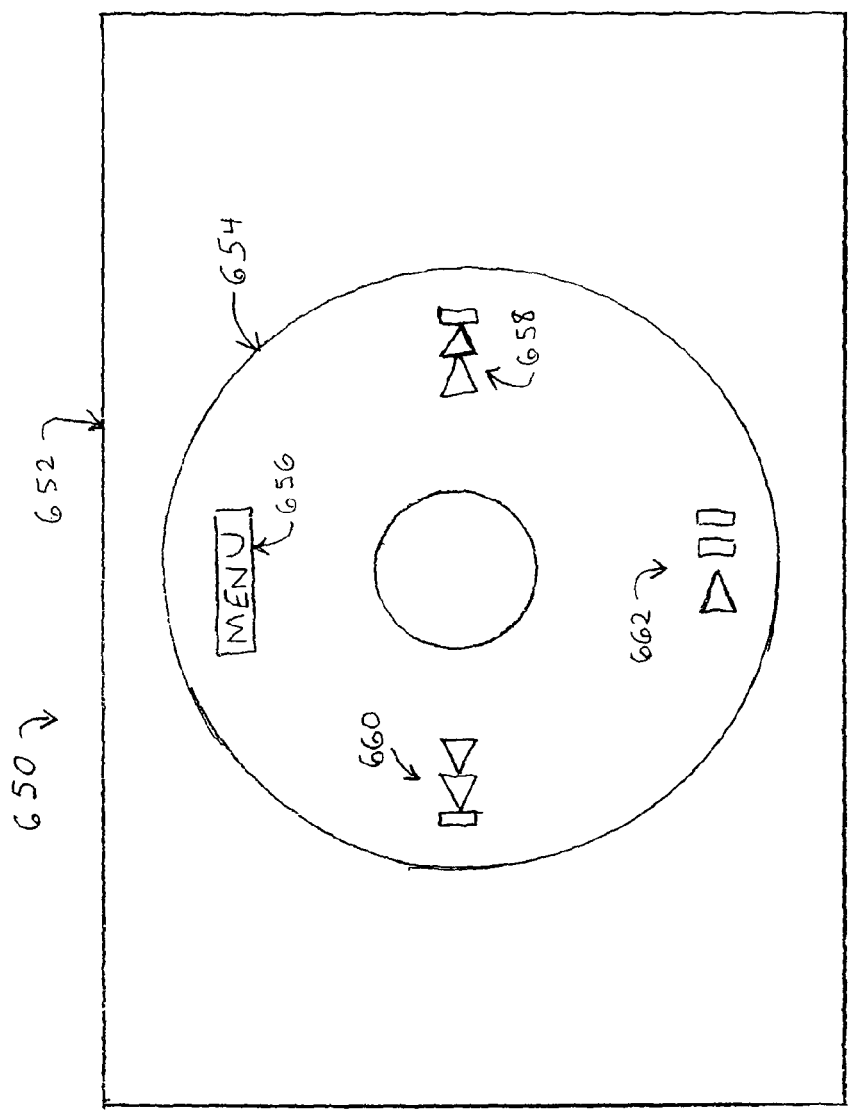
FIG. 32 is a top plan view of the entertainment side or entertainment panel of the communication device of FIG. 25 in one embodiment.
Figure 33:
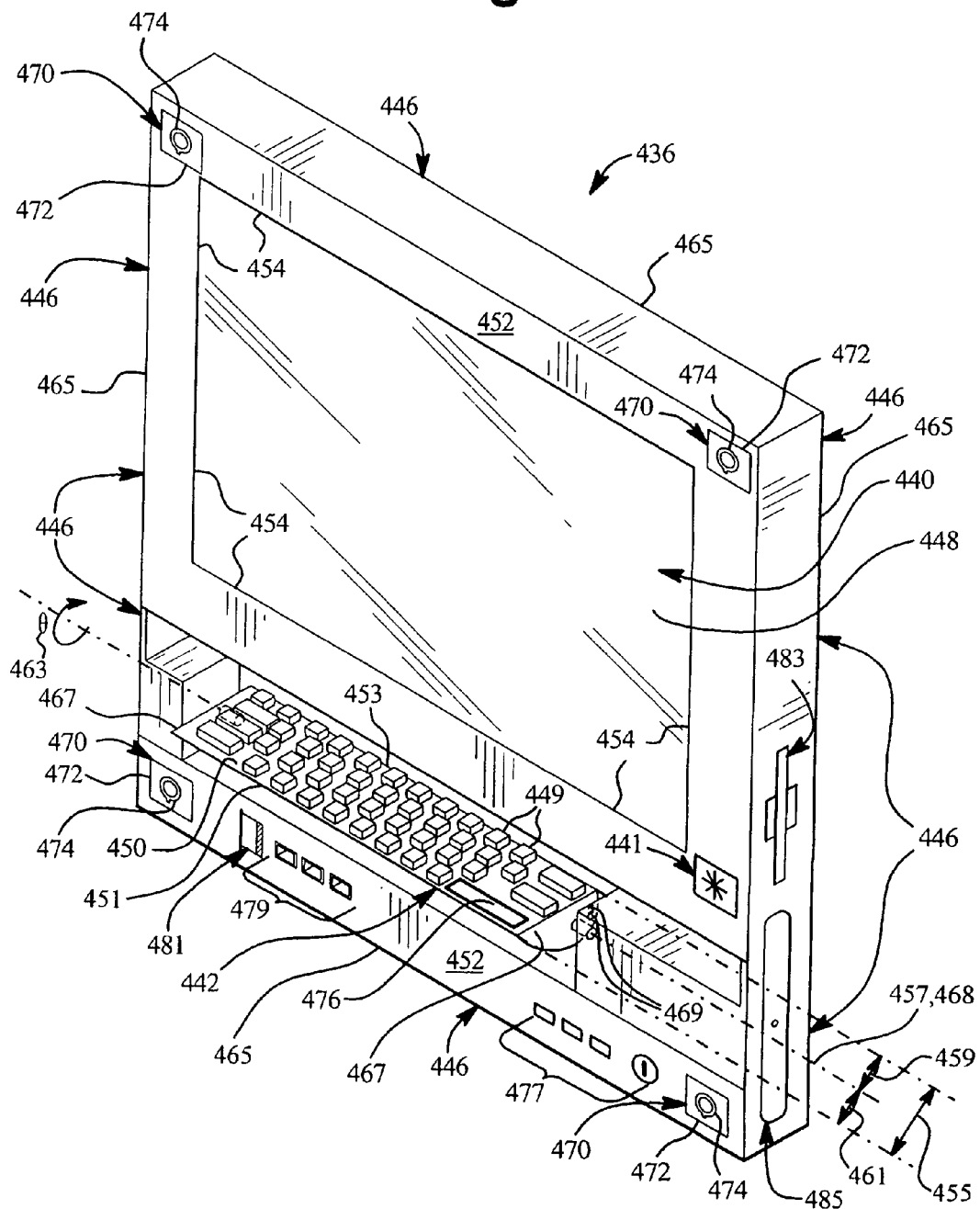
FIG. 33 is a front perspective view of the mountable computer in one embodiment.
Figure 34:
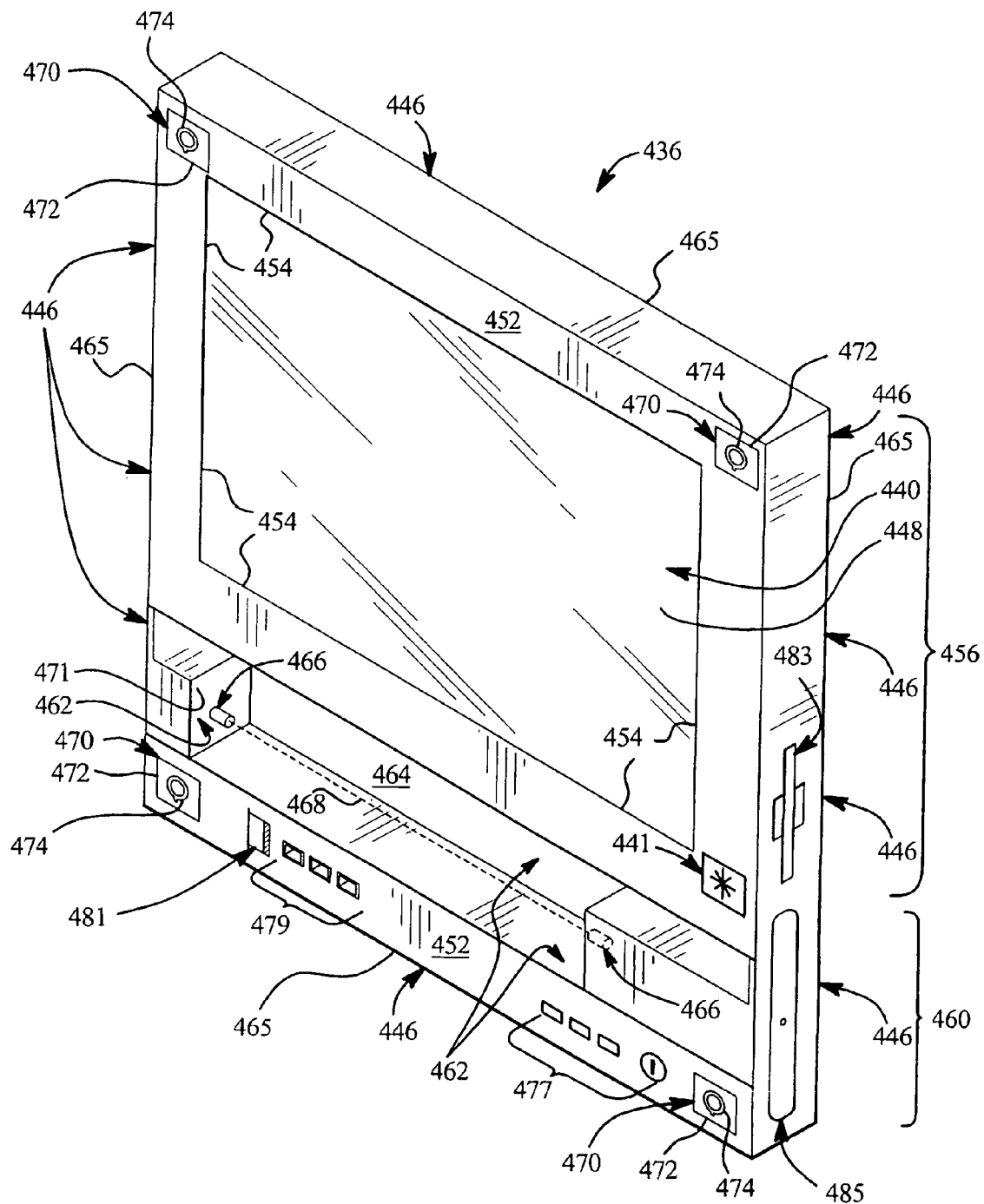
FIG. 34 is a front perspective view of the mountable computer of FIG. 33, illustrated with the keyboard removed.

Referring to FIG. 32, in one embodiment, the communication device 600 has an entertainment module having entertainment-related code used by the processor of the device 300 to provide music, video and photo display functionality. Here, the communication device 600 stores or accesses a plurality of songs, videos and photos which are accessible to the device 600 through a wire-based or wireless connection to song, video and photo sources, such as personal computers or webservers. In this embodiment, one side (not shown) of the input assembly 16 supports or carries keyboard 624, telephone control panel 626, keypad 627 or any suitable combination thereof.

The opposite side 650 supports or carries an entertainment panel 652. The entertainment panel 652 includes a relatively flat-configured joystick, input device or touch pad 654. The touch pad 654 has: (a) a menu input 656 enabling the user to access a menu of a plurality of songs, videos or photos and also enabling the user to select a desired song, video or photo to play or view; (b) a forward input 658 enabling the user to advance forward in a song, compilation of songs, video, compilation of videos or photo set; (c) a backward or reverse input 660 enabling the user to move backward or reverse in a song, compilation of songs, video, compilation of videos or photo set; and (d) a dual functional play/pause input 662 with play and pause functionality, enabling the user to activate play of a song or video or to pause play of a song or video. The user can use one side of the input assembly 16 to operate keyboard 624, telephone control panel 626, keypad 627 or any suitable combination thereof. When ready for entertainment, the user can rotate the input assembly 16 one hundred eighty degrees and use the opposite side 650 to operate the entertainment panel 652.

5.4 Camera & Video Recording Module

In one embodiment, the communication device 600 includes a digital camera device (not shown) and a video recorder (not shown), each of which is controlled by the processor of the device 600. One or more of the sides of the input assembly 16 can carry camera input devices and video recorder input devices.

5.5 Vibration Device

In one embodiment, the communication device 600 includes an electromechanical vibration device (not shown). The vibration device produces a vibration within the device 600 when a designated event occurs. The designated event can be a telephone call transmitted when the device 600 is placed in silent or vibrate mode. The designated event can also be a designated game event, such as a danger event, point losing event or other event associated with a loss in game success.

6. Mountable Computer

Referring to FIGS. 33 through 37, the mountable computer 436 is securable to an upstanding structure (not shown), such as a wall, seat or dashboard. It should be understood that the upstanding structure need not be perpendicular to a horizontal plane. The computer 436 includes: (a) a central processing unit (CPU) or processor 438 which controls a display device 440; (b) a keyboard 442 which enables a user to provide inputs to the processor 438; (c) a memory device 444 used by the processor 438 to perform a plurality of computer functions; (d) one or more speakers 441 for outputting sound; and (e) a housing 446 which houses the processor 438 and memory device 444 and which also supports the display device 440 and the keyboard 442.

The display device 440 has a screen 448 which is flat or substantially flat. Therefore, the screen 448 is substantially positionable in a plane. The keyboard 442 has: (a) a top surface 450; (b) a plurality of key input devices or keys 449 on the top surface 450; (c) a front side region or front side 451; (d) a back side region or back side 453; and (e) a plurality of end regions or ends 467, each of which has a length 455, midpoint 457 and portions 459 and 461. The top surface 450 is also substantially flat and therefore substantially positionable in a plane. In addition, the keyboard 442 has a cylindrical-shaped or semi-cylindrical shaped bottom surface. As described below, the user can adjust the position of the keyboard 442, through an angle 463, so that the top 450 of the keyboard 442 and the screen 448 substantially lie in the same plane.

The housing 446 has a back surface (not shown) which is engageable with the upstanding structure, and the housing 446 has a front surface 452 and a plurality of outer walls 465. In one embodiment, the front surface 452 is an integral, one-piece member constructed of a single mold. The front surface 452 has a plurality of walls 454 that define a screen opening (not shown) or a screen region 456. The screen opening is positioned in line with the screen 448 of the display device 440. The walls 454 surround the screen 448, enabling the user to view the screen 448 through the screen opening.

In addition, the front surface 452 has a keyboard region 460 located below the screen region 456. The front surface 452 has a plurality of inner walls or walls 462 defining a cut-away, space or cavity 464 within the keyboard region 460; and (b) at least one, and preferably a plurality of spaced apart coupling members 466 positioned within the keyboard region 460. The coupling members 466 are positioned along a common axis 468. In the embodiment illustrated in FIGS. 35 through 37, the coupling members 466 are rods or shafts which function as pivot points for the ends 467 of the keyboard 442. Here, the walls 462 function, in part, as guard members that protect the keyboard 442 from impact from people and objects.

The keyboard 442 is pivotable or rotatable between a first or closed position and a second or open position. In the closed position, the keyboard 442 is upwardly rotated or pivoted until the plane of the top surface 450 of the keyboard 442 is substantially parallel with the plane of the screen 448. In this position, the keyboard 442 is least likely to be damaged caused by contact with a person or an object passing by the computer 436. In addition, the closed keyboard 442 causes the computer 436 to occupy less space. In the open position, keyboard 442 is downwardly rotated or pivoted until the plane of the top surface 450 of the keyboard 442 is substantially perpendicular to or otherwise intersects with the plane of the screen 448. In this open position, illustrated in FIG. 33, the keyboard 442 has a conventional horizontal operating position even though the screen 448 has a vertical position. This makes is convenient for users to operate the keyboard 442 while standing, for example, in a kitchen.

In one embodiment, the housing 446 includes a keyboard position control device 469. In the illustrated embodiment, the position control device 469 includes a plurality of equally spaced-apart protrusions. The protrusions are positioned on the ends 467 of the keyboard 442. These protrusions removably mate with a plurality of slots (not shown) defined by each of the end walls 471 of the keyboard region 460. In operation, the user applies a certain degree of force in order to unseat the protrusions from the slots to reposition the keyboard 442.

In addition, the computer 436 has a plurality of securing members 470. Each securing member 470 includes a wall 472 which extends from the front surface 452 through the back surface of the computer 436. The wall 472 defines a fastener opening that is sized and shaped so as to receive a suitable screw, bolt or other fastener (not shown). The user can affix or secure the computer 436 to an upstanding structure, such as a kitchen wall, by inserting such fasteners through such fastener openings and securing the fasteners to the upstanding structure. Also, the securing members 470 include lock members or devices 474. The lock devices 474, in one embodiment, include a keyhole which enable only a user with a key to access such fasteners.

In one embodiment, the computer 436 has at least one hand-controlled input device other than the keyboard 442. In the illustrated example, the computer 436 has a touch pad 476 positioned on the keyboard 442. In other embodiments, the computer 436 has a mouse, a trackball and/or a stylus. The computer 436 also has plurality of standard input or control buttons 477 which enable the user to control certain settings of the computer 436 as well as the power of the computer 436.

The computer 436 also has a plurality of ports or connection devices 479 located on the front surface 452 of the housing 446 for convenient access. Here, a sliding door 481 is movable to cover and expose the connection devices 479. In one embodiment, a personal digital assistant (PDA) is connectable to one of these ports 479, and the computer 436 includes a PDA holder, PDA arm or another type of PDA support member adapted to support one or more PDA's. In addition, the computer 436 includes a hard disk drive 483 and a drive 485 which functions as a CDROM (Compact Disk-Read-Only Memory) drive and a DVD (Digital Video Disk) drive.

Referring to FIG. 35, in one embodiment, the housing 446 of the computer 436 includes a sliding coupling device 478 which slidably couples the keyboard 442 to the housing 446. The coupling device 478 includes an arc-shaped slot wall 480 positioned on each of the end walls 471 of the housing 446. Also, the coupling device 478 includes a protrusion member 482 connected to each end 467 of the keyboard 442. The protrusion member 482 is received by and mates with the slot wall 480. This enables the user to adjust the keyboard 442 by sliding the keyboard 442 along the arc-shaped slot wall 480.

As illustrated in FIG. 36, in one embodiment, the housing 446 of the computer 436 includes a pivoting coupling device 484 which pivotally couples the keyboard 442 to the housing 446. The coupling device 484 includes a hinge, pin, or shaft 486 coupled to each of the wall ends 471 of the keyboard region 460. Each of the shafts 486 is engaged with one of the ends 467 of the keyboard 442. This enables users to pivot the keyboard 442 upward and downward.

In another embodiment illustrated in FIG. 37, the computer 436 has a housing 488 which includes a screen region 490 and a keyboard region 492 located below the screen region 490. The housing 488 has a plurality of walls 494 that define a cavity 496. The cavity 496 extends from the front through the backside of the computer 436. The cavity 496 is sufficiently sized and shaped so as to receive the user's hands while the user is operating the keyboard 497. In this embodiment, the keyboard 497 is non-movably or rigidly connected to the lower wall 498 of the housing 488. It should be appreciated, however, that in other embodiments, the keyboard 497 can be adapted to have a designated incline or an angle adjustment device.

In another embodiment, the computer 436 has an electronic configuration including a processor, a system controller, a cache, and a data-path chip, each coupled to a host bus. The processor is a microprocessor such as a 486-type chip, a Pentium.RTM., Pentium.RTM. II, Pentium.RTM. III, Pentium.RTM. 4, or other suitable microprocessor. The cache provides high-speed local-memory data (in one embodiment, for example, 512 kB of data) for the processor, and is controlled by the system controller, which loads the cache with data that is expected to be used soon after the data is placed in the cache (i.e., in the near future).

The main memory is coupled between the system controller and data-path chip, and in one embodiment, provides random-access memory of between 16 MB and 256 MB or more of data. In one embodiment, the main memory is provided on SIMMs (Single In-line Memory Modules), while in another embodiment, the main memory is provided on DIMMs (Dual In-line Memory Modules), each of which plugs into suitable sockets provided on a motherboard holding other components. The main memory includes standard DRAM (Dynamic Random-Access Memory), EDO (Extended Data Out) DRAM, SDRAM (Synchronous DRAM), or other suitable memory technology. The system controller controls PCI (Peripheral Component Interconnect) bus, a local bus that provides a high-speed data path between the processor and various peripheral devices, such as graphics devices, storage drives and network cabling.

A data-path chip is also controlled by the system controller to assist in routing data between the main memory, the host bus, and the PCI bus. In one embodiment, the PCI bus provides a 32-bit-wide data path that runs at 33 MHz. In another embodiment, the PCI bus provides a 64-bit-wide data path that runs at 33 MHz. In yet other embodiments, the PCI bus provides 32-bit-wide or 64-bit-wide data paths that run at higher speeds. In one embodiment, PCI bus provides connectivity to an I/O bridge, a graphics controller, and one or more PCI connectors (i.e., sockets into which a card edge may be inserted), each of which accepts a standard PCI card. In one embodiment, the I/O bridge and the graphics controller are each integrated on the motherboard along with the system controller, in order to avoid a board-connector-board signal-crossing interface and thus provide better speed and reliability.

In this embodiment, the graphics controller is coupled to a video memory (that includes memory such as DRAM, EDO DRAM, SDRAM, or VRAM (Video Random-Access Memory)), and drives a VGA (Video Graphics Adaptor) port. The VGA port can connect to industry-standard monitors such as a VGA-type, SVGA (Super VGA)-type, XGA-type (eXtended Graphics Adaptor) or SXGA-type (Super XGA) display devices.

Other input/output (I/O) cards having a PCI interface can be plugged into the PCI connectors. The network connections providing video input are also represented by the PCI connectors, and include Ethernet devices and cable modems for coupling to a high speed Ethernet network or cable network which is further coupled to the Internet.

In one embodiment, the I/O bridge is a chip that provides connection and control to one or more independent IDE or SCSI connectors, to a USB (Universal Serial Bus) port, and to an ISA (Industry Standard Architecture) bus. In this embodiment, the IDE connector provides connectivity for up to two standard IDE-type devices such as hard disk drives, CDROM (Compact Disk-Read-Only Memory) drives, DVD (Digital Video Disk) drives, videocassette recorders, or TBU (Tape-Backup Unit) devices. In one similar embodiment, two IDE connectors are provided, and each provide the EIDE (Enhanced IDE) architecture. In the embodiment shown, a SCSI (Small Computer System Interface) connector provides connectivity for up to seven or fifteen SCSI-type devices (depending on the version of SCSI supported by the embodiment).

In one embodiment, the I/O bridge provides an ISA bus having one or more ISA connectors (in one embodiment, three connectors are provided). In one embodiment, the ISA bus is coupled to the I/O controller, which in turn provides connections to two serial ports, a parallel port, and a FDD (Floppy-Disk Drive) connector. At least one serial port is coupled to a modem for connection to a telephone system providing Internet access through an Internet service provider. In one embodiment, the ISA bus is connected to a buffer, which is connected to an X bus, which provides connections to a real-time clock, a keyboard/mouse controller and a keyboard BIOS ROM (Basic Input/Output System Read-Only Memory) 345, and to a system BIOS ROM.

The computer 436 performs several functions. Such functions are implemented in software in one embodiment, where the software comprises computer executable instructions stored on computer readable media such as disk drives coupled to connectors, and executed from the main memory and the cache. The term "computer readable medium" is also used to represent carrier waves on which the software is transmitted.

It should be appreciated that each of the computer 436 can have any size which is suitable for its application. In one embodiment, the screen of the computer is sized similar to that of a conventional personal computer. In another embodiment, the computer is miniaturized or relatively small so that the computer can be mounted within a dashboard of a vehicle.

The computer 436 has a built-in keyboard which is positioned or positionable for operation while the computer is secured to an upstanding structure, such as a wall. The wall-mountable computer brings the functionality of the personal office computer to those involved in carrying out household activities on a regular basis. The integrated keyboard enables the computer to be relatively thin which, in turn, safeguards the computer and enhances the aesthetics of the computer. This type of computer provides a relatively high degree of convenience to computer users.

Figure 38:
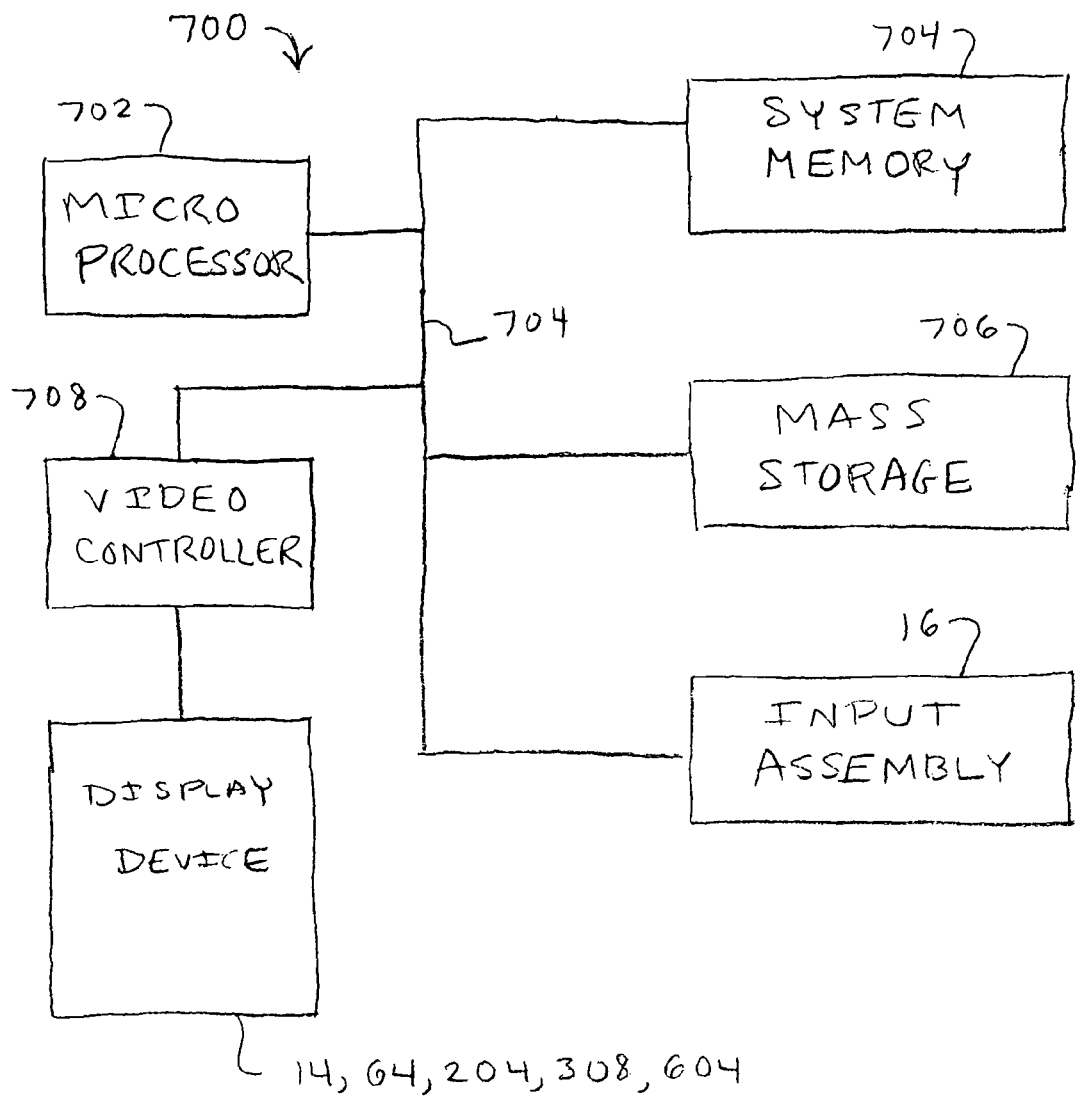
FIG. 38 is a schematic block diagram of the electronic configuration or computer system in one embodiment.

In one embodiment illustrated in FIG. 38, the electronic system 152 described above is replaced or integrated with the computer system 700. Computer system 700 includes a microprocessor 702 with access to a system memory device 704, each of which is connected to a bus 704. Bus 704 serves as a connection between microprocessor 702 and other components of computer system 700. The input assembly 16 is coupled to microprocessor 702 to provide input to microprocessor 702. Programs and data are stored on a mass storage device 706, which is coupled to microprocessor 702. Mass storage devices include such devices as hard disks, optical disks, magneto-optical drives, floppy drives and the like. Each display device 14, 64, 204, 308 and 604 is coupled to microprocessor 702 by a video controller 708. A system memory 710 is coupled to microprocessor 702 to provide the microprocessor 702 with relatively fast storage to facilitate execution of busses. Intermediate circuits can be deployed between the components described above and microprocessor 702 to facilitate interconnection between the components and the microprocessor 702.

It should be appreciated that the electronic devices and computers described herein can include any information handling system which, in turn, can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment or other purposes. For example, an information handling system may be a personal computer, a network storage device, or any other suitable device and may vary in size, shape, performance, functionality, and price. The information handling system may include RAM, one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as input assembly 16 and a video display. The information handling system may also include one or more buses operable to transmit communications between the various hardware components.

In one embodiment, the input assembly 16 (or the computer or electronic device attached thereto) includes one or more of the following elements: (a) a credit card or data card reader enabling data on a user's data card to be read by the processor of the input assembly 16 or the processor of the electronic device or computer on which the input assembly 16 is mounted; (b) an illuminated bezel, panel or cord bordering one or both of the sides of the input assembly 16; (c) one or more light sources coupled to or housed within such cord; (d) one or more supplementary pointing devices such as mouses, trackballs and trackpads; and (e) a remote control device having a laser or signal generator and a remote control panel with a plurality of buttons or other suitable input devices mounted on one side of the input assembly 16, including, but not limited to, a television remote control, DVD player remote control, stereo remote control and garage door opener or other remote opener.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A device comprising: at least one processor; at least one memory device accessible by the processor, the at least one memory device including a mass storage device; a display device controllable by the processor, the display device having a screen; a housing supporting the display device, the housing having a back side located behind the screen, the back side being configured to be mounted to an upstanding structure, the back side defining a plurality of mount openings, each one of the mount openings being configured to receive a portion of a fastener, the at least one processor being positioned within the housing; a support rotatably coupled to the housing, the support having a first side, a second side, a first end, and a second end; a plurality of shaft members extending along an axis, the axis extending through at least part of the housing, a first one of the shaft members coupling the first end of the support to the housing, a second one of the shaft members coupling the second end of the support to the housing; a data input device carried on the first side of the support, the data input device positioned between the first and second ends of the support; and at least one input device carried on the second side of the support, the at least one input device positioned between the first and second ends of the support.

2. The device of claim 1, wherein at least one of the first and second shaft members defines an opening configured to receive a wire, the wire operatively coupling the data input device to the processor.

3. The device of claim 1, wherein the mass storage device includes a hard disk drive.

4. The device of claim 1, wherein the data input device includes a plurality of full-sized keys, each of the full-sized keys having a typing function.

5. The device of claim 1, which includes a CD drive operatively coupled to the processor, the CD drive being supported by the housing.

6. The device of claim 1, wherein a rotation resistance device includes at least one damper configured to resist rotation of the support during the rotation of the support.

7. The device of claim 1, which includes at least one rotation resistance device coupled to the support, the rotation resistance device configured to apply a resistance force to the support.

8. The device of claim 6, which includes at least one position control device operatively coupled to the support.

9. The device of claim 1, which includes a support holder rotatably coupled to the housing, the support holder holding the support, wherein: (a) the support holder is rotatable relative to the housing about one axis; and (b) the support is rotatable relative to the support holder about another axis.

10. An electronic device comprising: a processor; a mass storage device operatively coupled to the processor; a display device operatively coupled to the processor, the display device having a screen; a housing supporting the display device, the housing having a back side located behind the screen, the back side being configured to be mounted to an upstanding structure, the back side defining a plurality of mount openings, each one of the mount openings being configured to receive a portion of a fastener, the processor being positioned within the housing; an input assembly rotatably coupled to the housing, the input assembly having: (a) a plurality of sides; (b) a keyboard coupled to a first one of the sides; and (c) at least one input device coupled to a second one of the sides; at least one shaft member extending along an axis, the axis extending through at least part of the housing, the shaft member coupling the input assembly to the housing; and at least one rotation resistance device coupled to the input assembly, the rotation resistance device being configured to apply a resistance force to the support during rotation of the support.

11. The electronic device of claim 10, wherein the shaft member defines an opening, the electronic device having a wire positioned within the opening, the wire operatively coupling the keyboard to the display device.

12. The electronic device of claim 10, which includes a CD drive operatively coupled to the processor, the CD drive being supported by the housing.

13. The electronic device of claim 10, wherein: (a) the input device has a plurality of ends; and (b) the electronic device includes a second shaft member extending along the axis, the second shaft member having a second end, the at least one shaft member being coupled to one of the ends, the another shaft member being coupled to the second end.

14. The electronic device of claim 10, wherein the mass storage device includes a hard disk drive.

15. The electronic device of claim 13, wherein the keyboard has a plurality of keys arranged in a QWERTY arrangement, each of the keys being a full-sized key.

16. The electronic device of claim 10, which includes a position control device operatively coupled to the input assembly.

17. An electronic device comprising: data processing means; mass storage means operatively coupled to the data processing means; producing means for producing a visual output, the producing means being operatively coupled to the data processing means, the producing means having a screen; housing means for housing at least part of the producing means, the housing means having a means for mounting the housing means to an upstanding structure, the mounting means being located behind the screen, the data processing means being positioned within the housing means; supporting device having: (a) a first end; (b) a second end; (c) a first side for supporting an input device; and (d) a second side for supporting another input device ; first coupling means for rotatably coupling the first end of the supporting device to the housing means, the first coupling means extending along an axis, the axis extending through at least part of the housing means; second coupling means for rotatably coupling the second end of the supporting device to the housing means, the second coupling means extending along the axis, the axis extending through at least part of the housing means; and resistance means for applying a resistance force to the supporting device during rotation of the supporting device.

18. The electronic device of claim 17, wherein at least one of the first and second coupling means defines an opening, the electronic device having a wire positioned within the opening, the wire operatively coupling at least one of the input devices to the producing means.

19. The electronic device of claim 17, wherein the mass storage means includes a hard disk drive.

20. The electronic device of claim 17, which includes CD reading means for reading a CD, the CD reading means being supported by the housing means.

* * * * *